US012618002B2

(12) United States Patent
Araki et al.

(10) Patent No.: US 12,618,002 B2
(45) Date of Patent: May 5, 2026

(54) PASSIVE THERMAL SWITCH COATING AND A METHOD RELATING THERETO

(71) Applicant: UNIVERSITY OF NORTH TEXAS, Dallas, TX (US)

(72) Inventors: Ken Araki, Dallas, TX (US); Richard Z. Zhang, Dallas, TX (US)

(73) Assignee: UNIVERSITY OF NORTH TEXAS, Dallas, TX (US)

( * ) Notice: Subject to any disclaimer, the term of this patent is extended or adjusted under 35 U.S.C. 154(b) by 199 days.

(21) Appl. No.: 18/349,125

(22) Filed: Jul. 8, 2023

(65) Prior Publication Data

US 2024/0010910 A1     Jan. 11, 2024

Related U.S. Application Data

(60) Provisional application No. 63/359,365, filed on Jul. 8, 2022.

(51) Int. Cl.
C09K 9/00 (2006.01)
C01G 31/02 (2006.01)

(52) U.S. Cl.
CPC .............. C09K 9/00 (2013.01); C01G 31/02 (2013.01); *C01P 2006/32* (2013.01); *C01P 2006/60* (2013.01)

(58) Field of Classification Search
CPC ........................................................ C09K 9/00
USPC ........................................................ 428/696
See application file for complete search history.

(56) References Cited

PUBLICATIONS

Dong et al., "Thin film design for advanced thermochromic smart radiator devices", Chinese Physics, vol. 16 No. 6 Jun. 2007, URL: <https://iopscience.iop.org/article/10.1088/1009-1963/16/6/037/pdf>, Pgs. Title, 1704-1709 (Year: 2007).*
Shin et al., "Metal-VO2 hybrid grating structure for a terahertz active switchable linear polarizer", Nanotechnolog 26, Published Jul. 17, 2015, URL: <https://iopscience.iop.org/article/10.1088/0957-4484/26/31/315203/pdf>, pp. 1-8 (Year: 2015).*

* cited by examiner

*Primary Examiner* — Katherine A Christy
(74) *Attorney, Agent, or Firm* — Andrew M. Metrailer; Conley Rose, P.C.

(57) ABSTRACT

A passive thermal switch coating can include: a first thermochromic oxide layer; a layer of an infrared-transparent dielectric material; and a second thermochromic oxide layer. The infrared-transparent dielectric material can be disposed between the first thermochromic oxide layer and the second thermochromic oxide layer. The thermal switch coating can also include a substrate, and the second thermochromic oxide layer can be disposed on the substrate.

20 Claims, 18 Drawing Sheets

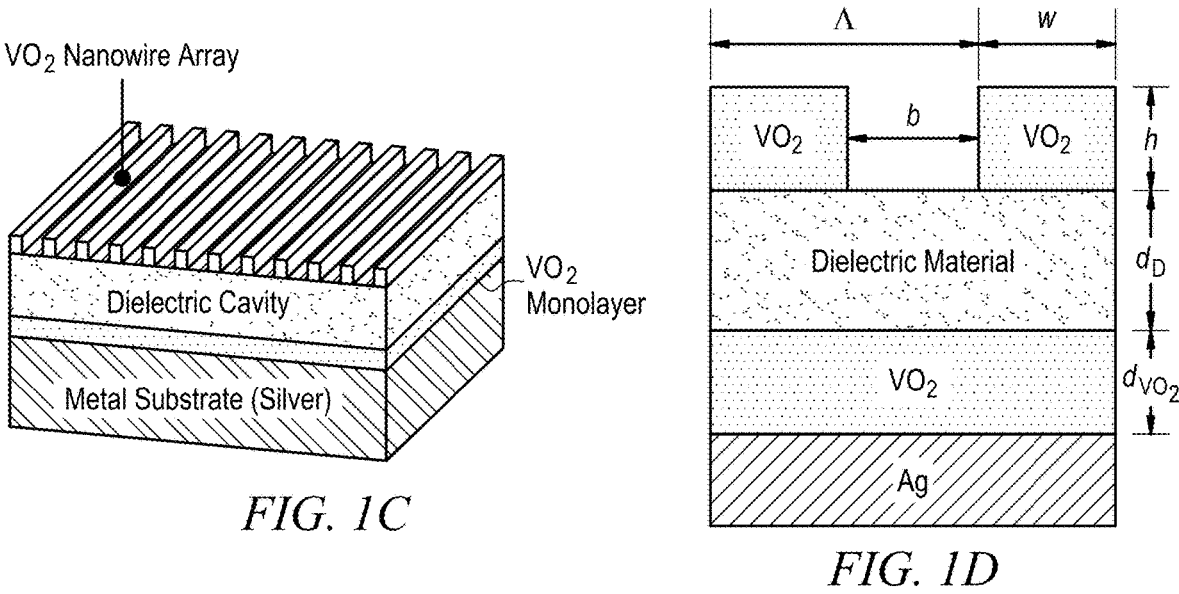
*FIG. 1C*
*FIG. 1D*
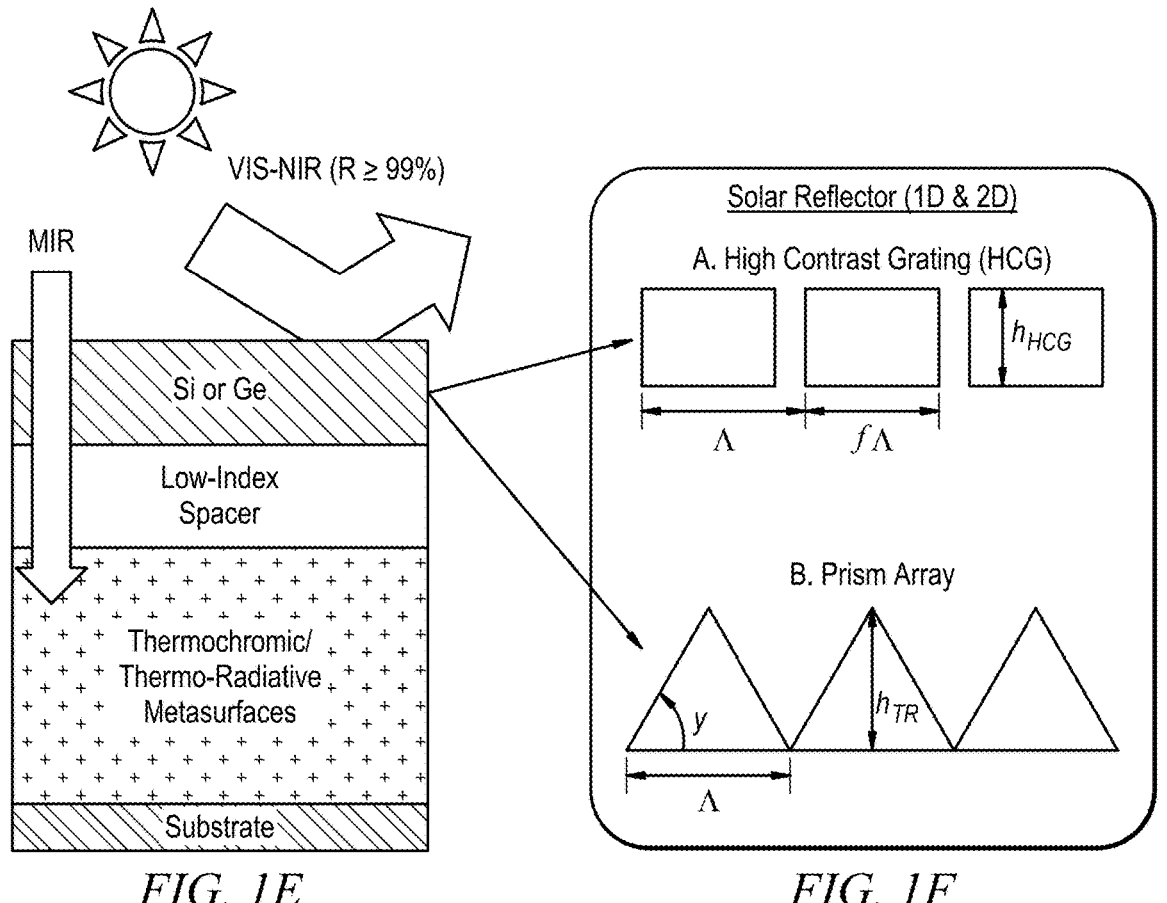
*FIG. 1E*
*FIG. 1F*

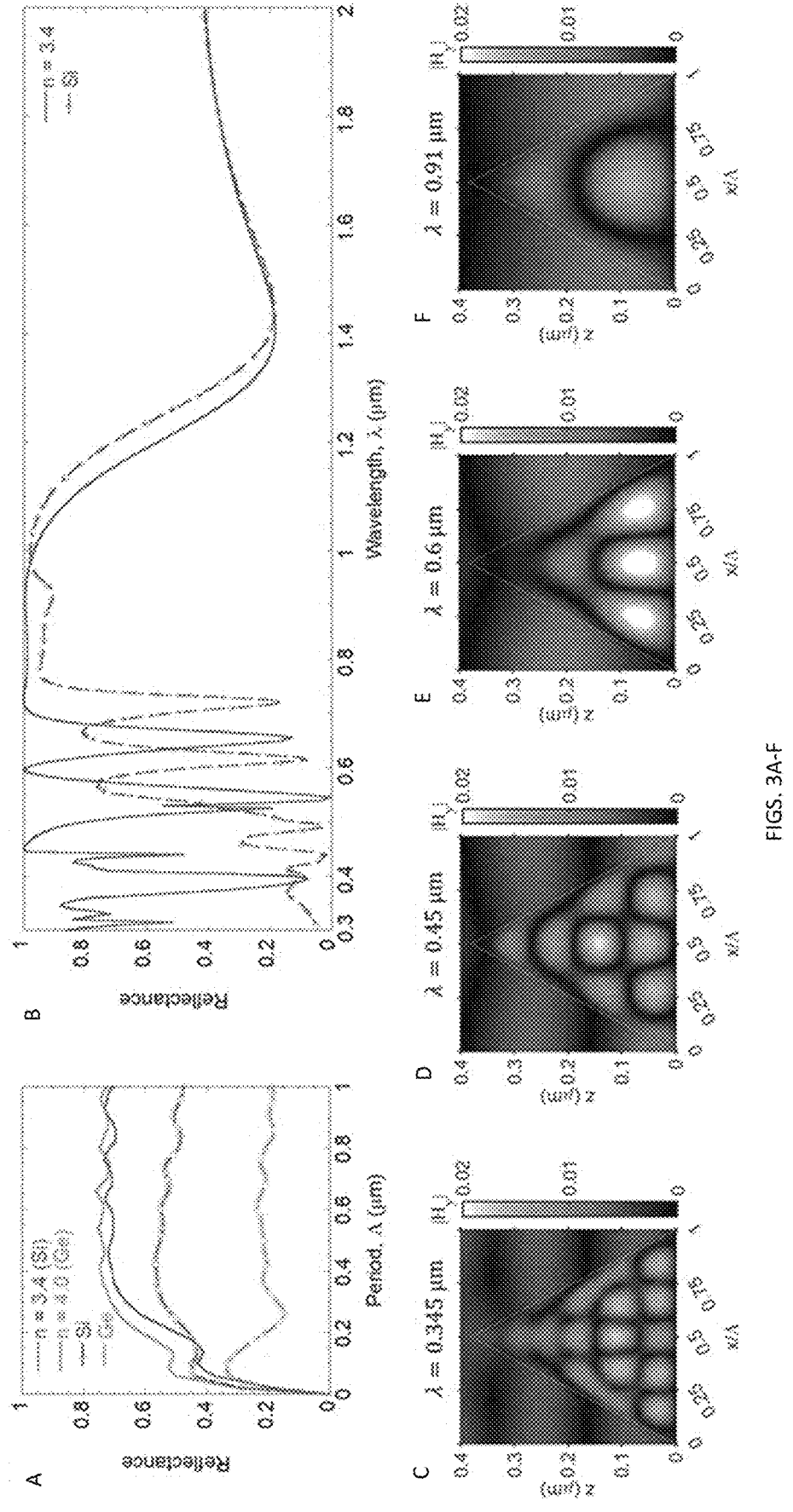
FIGS. 3A-F

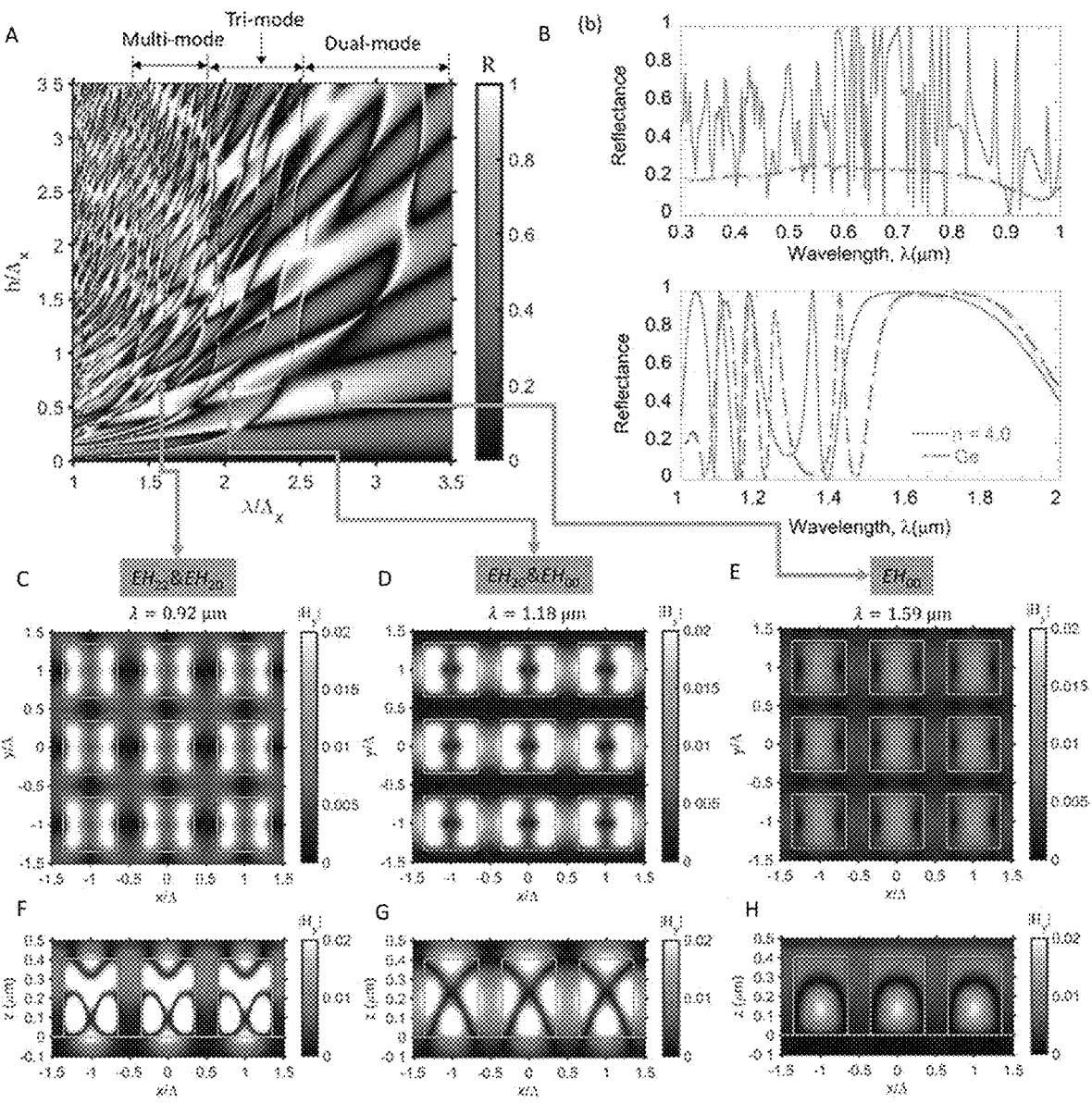
FIGS. 4A-H

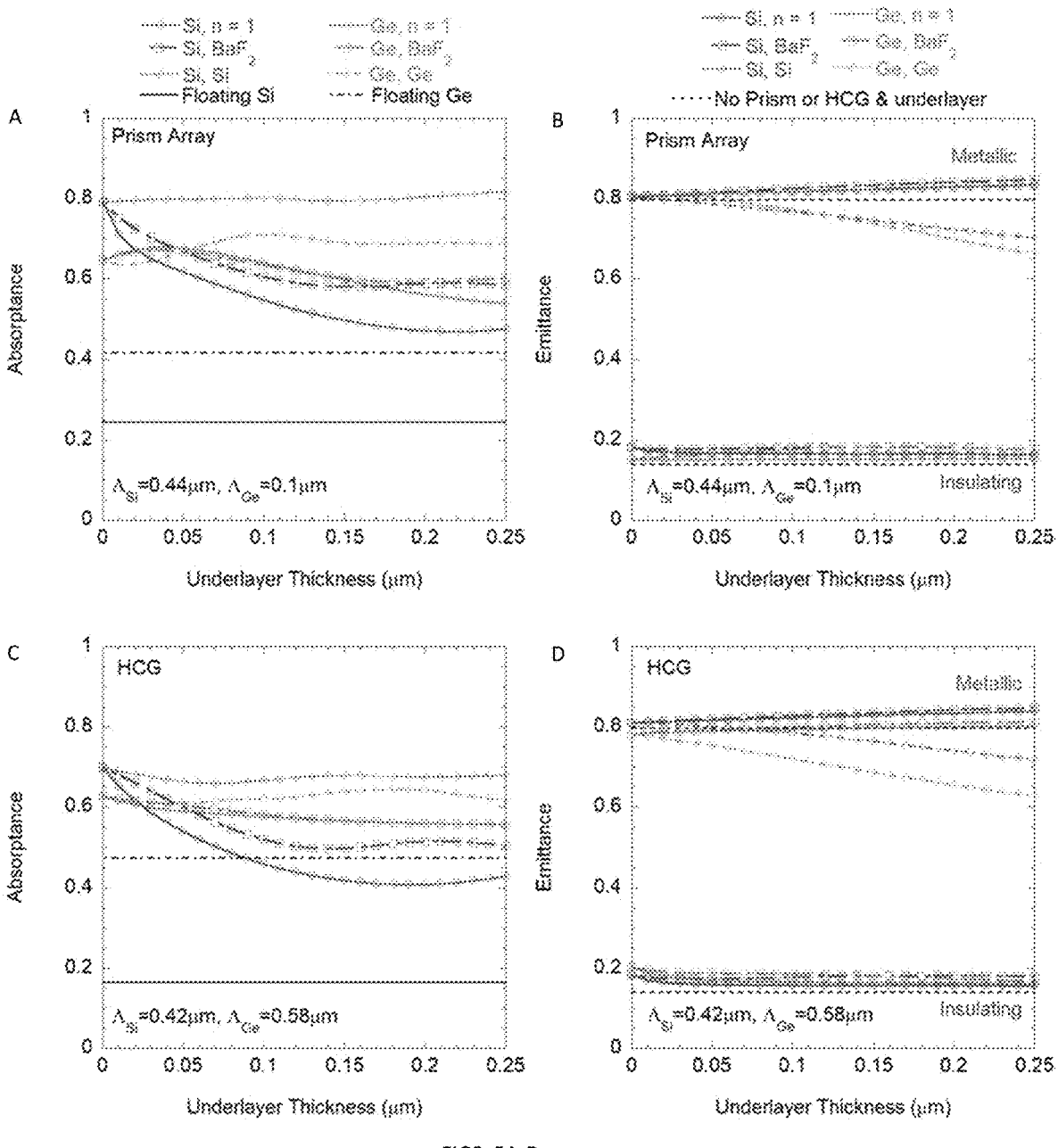
FIGS. 5A-D

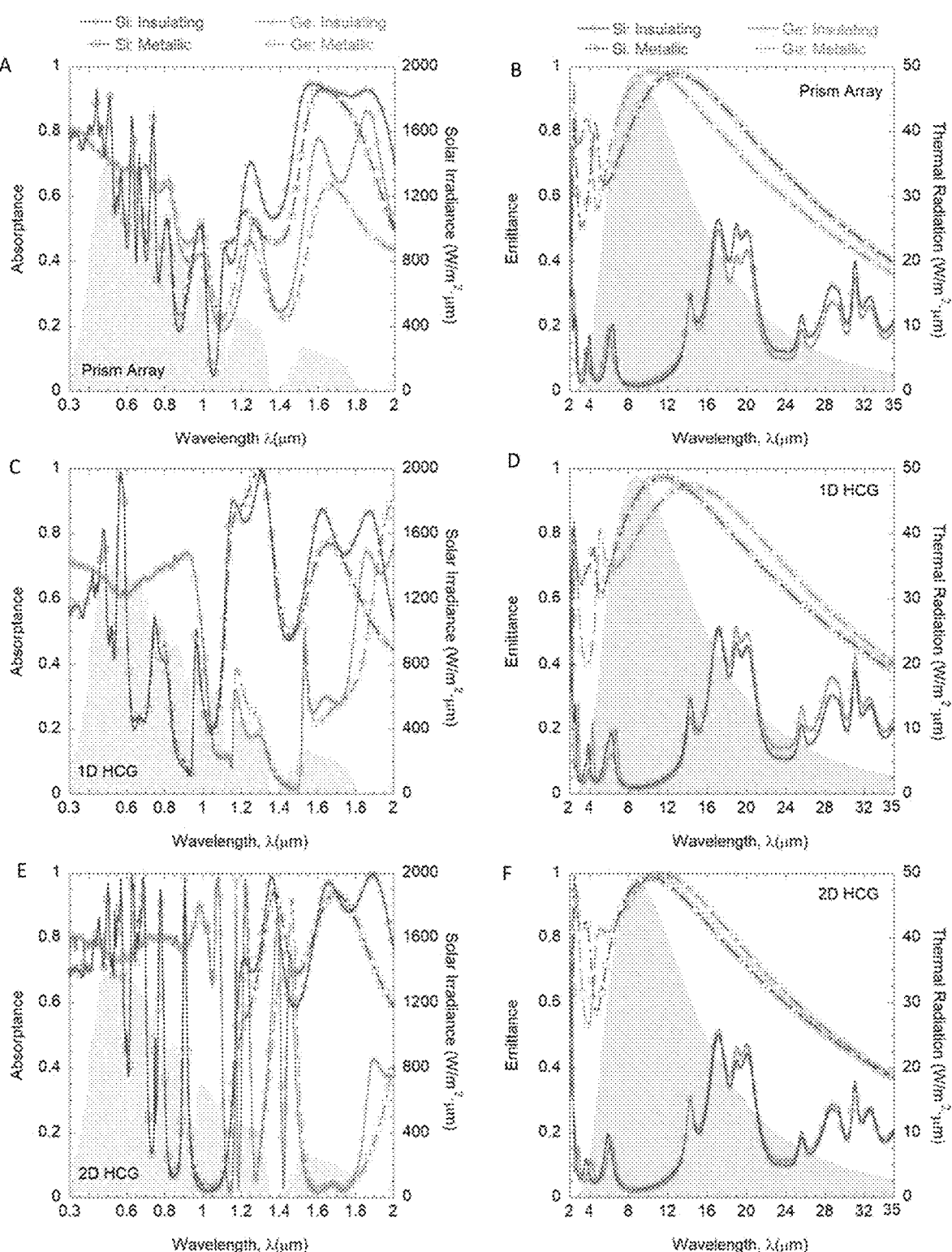
FIGS. 6A-F

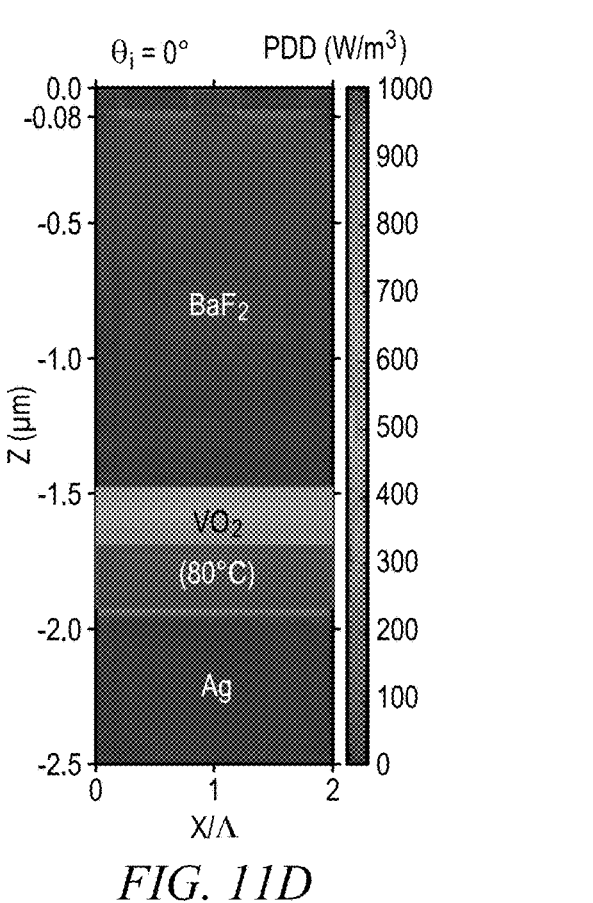
*FIG. 11D*                         *FIG. 11E*
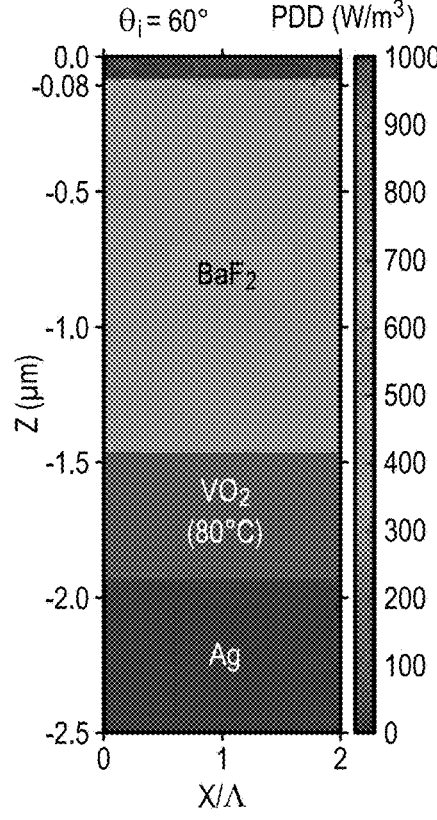
*FIG. 11F*

PASSIVE THERMAL SWITCH COATING AND A METHOD RELATING THERETO

CROSS-REFERENCES TO RELATED APPLICATIONS

This application claims the benefit of U.S. Provisional Application No. 63/359,365, filed on Jul. 8, 2022, and entitled "Switchable Emission Coating Comprising Thermochormic Oxide Multilayers and Reflecting High-Contrast Grating," which is incorporated herein by reference in its entirety for all purposes.

BACKGROUND

Optical properties of thin films can be manipulated by introducing multilayered nanopatterns or periodic nanoelements that interface with electromagnetic waves from the visible to infrared. Various types of engineered nanoscale coatings include sub-diffraction plasmonic gratings, ultra-high reflection high contrast gratings, traditional diffraction gratings, and simple multilayers such as Fabry-Perot quarter-wave layers. Among those considered, nanoscale metasurfaces are potentially useful in photovoltaic device improvement and thermal emission regulation.

SUMMARY

In some embodiments, a passive thermal switch coating comprises: a first thermochromic oxide layer; a layer of an infrared-transparent dielectric material; and a second thermochromic oxide layer, wherein the infrared-transparent dielectric material is disposed between the first thermochromic oxide layer and the second thermochromic oxide layer.

In some embodiments, a method of providing a passive thermal switch coating comprises: disposing a first thermochromic oxide layer; disposing a layer of an infrared-transparent dielectric material; and disposing a second thermochromic oxide layer, wherein the infrared-transparent dielectric material is disposed between the first thermochromic oxide layer and the second thermochromic oxide layer.

In some embodiments, insulator-to-metal temperature phase transition vanadium dioxide ($VO_2$) can enable radiative property switching in the mid- to far-infrared wavelengths. With computational optimization of grating arrangement and layer thickness parameters, identification of a monolithic high-performance turn-down thermal emittance coating can be no more than 2 $\mu m$ thick, consisting of a $VO_2$ sub-wavelength nanowire grating array on an index-matched Fabry-Perot dielectric thin film on an additional absorbing $VO_2$ sublayer. The working principles of this optimized $VO_2$ structure are its gradient refractive index allowing high through-coating transmittance in the cold state, and its near-unity emissivity from semi-metal-insulator-metal plasmonic coupling in the hot state. This anisotropic patterned structure also considers performance over polarized incident light. A survey of other Fabry-Perot cavity materials with refractive index matching points to higher turn-down performances given an optimal $VO_2$ nanowire volume filling ratio. With 24-hour solar and environmental analysis in comparison to other $VO_2$ metasurfaces and multilayers, this coating enables responsive passive radiative cooling at high temperatures exceeding transition. This nano- and micro-patterned coating can potentially impact self-cooling of the solar cells, batteries, and electrical devices where risk presents at high temperatures.

In some embodiments, thermochromic and thermo-radiative cooling metasurfaces can require broadband high reflection in visible-to-near infrared region to block the direct sunlight. The sunlight absorption can be prevented by implementing the structure that creates high contrast in refractive index using Si and Ge. The near-wavelength high contrast grating and prism array provides less solar absorption, but full transparency in mid-infrared region. Similar electromagnetic field responses are observed for both structures to enhance reflectance greater than 0.99. Simultaneous VIS-NIR reflection and MIR transparency may be achieved.

In some embodiments, passive infrared emittance switching can be achieved with a metal-to-insulating phase transition material vanadium dioxide ($VO_2$), but its non-transitioning bandgap results in high absorptance in the visible wavelength range. To achieve a half-order reduction of absorptance in the visible to near-infrared region, integrated dielectric photonic metasurface structures can be designed on monolithic $VO_2$ coatings. This combination of nano- and/or micro-patterned dielectric diffractive and resonant gratings with a multilayer $VO_2$ structure can preserve the terrestrial thermal wavelength emission switching capabilities. A periodic microscale diffractive prism array can be demonstrated by comparing the reflectance provided by either infrared-transparent germanium (Ge) or silicon (Si). Despite the advantage of total internal reflection in the broad near-infrared region, some bandgap absorption limits the performance in the visible wavelengths. A better theoretical means to reflect broadband light via waveguide-like Fabry-Pérot resonance are near-wavelength 1D and 2D High Contrast Grating (HCG) high-index metasurface structures surrounded by a low-index host medium. This HCG metasurface may allow broadband high-quality reflection within the dual-mode (or tri-mode) region from 1.0 to 2.2 $\mu m$ wavelengths for HCG with a refractive index of 4.0, which corresponds to Ge. The thermal performance of these metasurface augments can be aimed to enable thermally switchable passive radiative cooling—thermal emission exceeding solar absorption—of solar cells, terrestrial buildings, and energy storage devices.

These and other features will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

FIG. 1C is a schematic of an embodiment of vanadium dioxide ($VO_2$) nanowire, dielectric material, and $VO_2$ sub-monolayer coating on silver (Ag) substrate.

FIG. 1D is a schematic of an embodiment of geometric parameters of the coating including a dielectric cavity or monolayer thicknesses d, nanowire grating period $\Lambda$, its width w, height h, and groove spacing b.

FIGS. 1E-1F are schematics of embodiments of mid-infrared transparent solar reflector using high contrast grating (E) or prism array (F) for thermochromic and thermosradiative metasurfaces. $\Lambda$ is the period, f is the filling ratio, $h_{HCG}$ is the height, $\gamma$ is the corner angle and $h_{TR}$ is the height of the prism.

FIG. 3A is a graphical depiction of a reflectance contour of 1D Ge (n equals 4.0) HCG.

FIG. 3B is a reflectance spectrum of 1D HCG. The solid line represents lossless Ge (n equals 4.0), and the dashed line represents real Ge.

FIGS. 3C-3D are pictorial depictions of magnetic field distributions in the xy-plane.

FIGS. 3E-3F are pictorial depictions in the xz-plane of, respectively, $H_{y2}$ and $H_{y0}$ modes.

FIG. 4A is a pictorial depiction of reflectance contour of 2D Ge (n equals 4.0) HCG.

FIG. 4B is a graphical depiction of a reflectance spectrum of 2D HCG. The solid line represents lossless Ge (n equals 4.0), and the dashed line represents real Ge.

FIGS. 4C-4H are pictorial depictions of magnetic field distributions of $EH_{22}$, $EH_{20}$, and $EH_{00}$ modes in xy and xz-planes.

FIGS. 5A and 5C are graphical depictions of a relationship between total normal absorptance in the visible-to-near-infrared region and underlayer thickness for the (A) prism array and (C) 1D HCG.

FIGS. 5B and 5D are graphical depictions of a relationship between emittance in the mid-infrared region and underlayer thickness for the (B) prism array and (D) 1D HCG.

FIGS. 6A, 6C, and 6E are graphical depictions of an absorptance spectrum of the (A) prism array, (C) 1D HCG, and (E) 2D HCG on the thermal emitter ($VO_2/BaF_2NO_2/Ag$) with the $BaF_2$ spacer.

FIGS. 6B, 6D, and 6F are graphical depictions of an emittance spectrum of the (B) prism array, (D) 1D HCG, and (F) 2D HCG on the thermal emitter ($VO_2/BaF_2NO_2/Ag$) with $BaF_2$ spacers corresponding to Tables I and II below.

FIGS. 11A-F are graphical depictions of oblique TM wave power dissipation density (PDD) distribution showing near-Reststrahlen band absorption in the dielectric $BaF_2$ cavity of the optimized coating at $\lambda$=28 µm for incident angles: (A) $\theta$ equals 0°, (B) $\theta$ equals 30°, and (C) $\theta$ equals 60° at cold state, and (D) $\theta$ equals 0°, (E) $\theta$ equals 30°, and (F) $\theta$ equals 60° at hot state, calculated by RCWA.

DETAILED DESCRIPTION

Figure 1A:
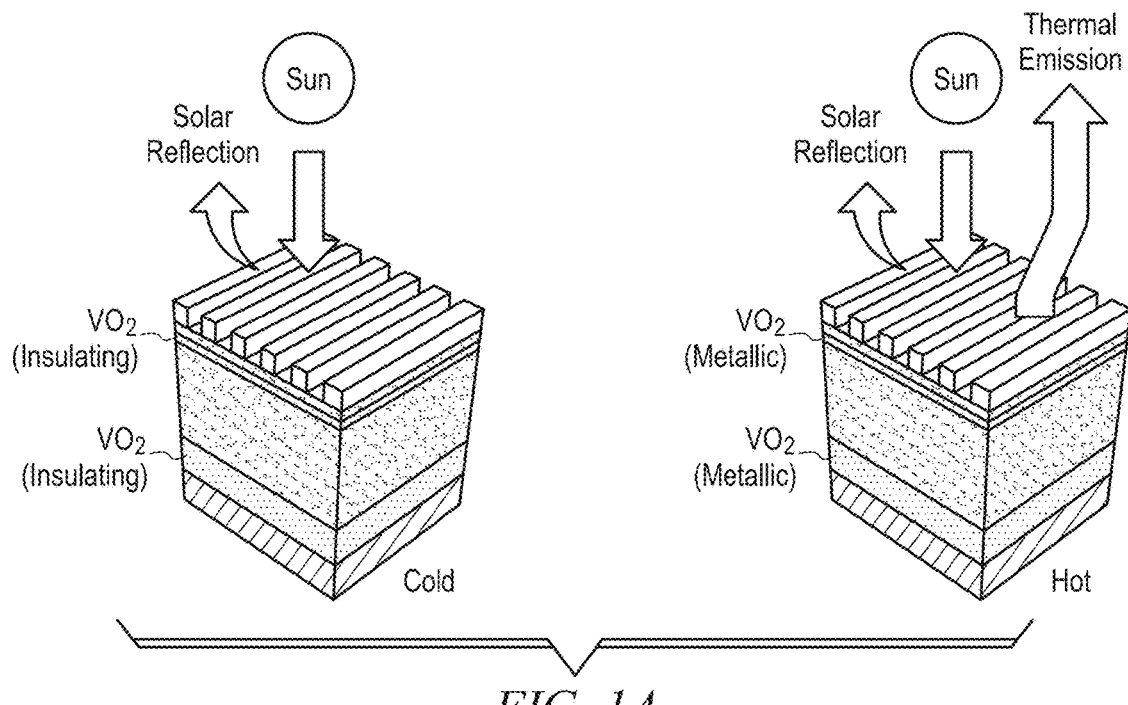
FIG. 1A is a schematic of an embodiment of a high-index solar reflector integrated on the self-adaptive $VO_2$-based thermal emitter.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques below, including the exemplary designs and implementations illustrated and described herein, but may be modified within the scope of the appended claims along with their full scope of equivalents.

Embodiments are discussed herein with reference to the Figures. However, those skilled in the art will readily appreciate that the detailed description given herein with respect to these figures is for explanatory purposes as the systems and methods extend beyond these limited embodiments. For example, it should be appreciated that those skilled in the art will, in light of the teachings of the present description, recognize a multiplicity of alternate and suitable approaches, depending upon the needs of the particular application, to implement the functionality of any given detail described herein, beyond the particular implementation choices in the following embodiments described and shown. That is, there are numerous modifications and variations that are too numerous to be listed but that all fit within the scope of the present description. Also, singular words should be read as plural and vice versa and masculine as feminine and vice versa, where appropriate, and alternative embodiments do not necessarily imply that the two are mutually exclusive.

It is to be further understood that the present description is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present systems and methods. It must be noted that as used herein and in the appended claims (in this application, or any derived applications thereof), the singular forms "a," "an," and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this description belongs. Preferred methods, techniques, devices, and materials are described, although any methods, techniques, devices, or materials similar or equivalent to those described herein may be used in the practice or testing of the present systems and methods. Structures described herein are to be understood also to refer to functional equivalents of such structures. The present systems and methods will now be described in detail with reference to embodiments thereof as illustrated in the accompanying drawings.

One desirable attribute of films is thermochromic tuning—the ability to change optical properties with engineered surface temperature—which may result in self-cooling amid temperature or environmental changes. Temperature phase change materials, such as vanadium dioxide ($VO_2$), $SmNiO_3$, $Ti_3O_5$, and many others can tailor the optical properties during heat changes.

The material $VO_2$ integrated in photonic multilayers and gratings have demonstrated thermal radiative switching. A common coating design utilizes the concept of Fabry-Perot cavity interference to obtain low emittance when cool and high emittance when hot. More complex multilayers can be added, for the purpose of daytime radiative cooling, as absorption to solar radiation is minimized compared to the emission in the infrared. Other designs have patterned at-wavelength size scale cylindrical gratings. So far, the turn-down thermal performance of such coatings has been less than anticipated. The optimal thermochromic metastructure is desirably designed by weighting the Planck blackbody distribution at the corresponding wavelengths and temperatures close to the phase transition, as determined by Wien's displacement law.

Photonic infrared switching using a phase transition material, vanadium dioxide ($VO_2$), has gained popularity in recent years due to its passive insulating-to-metal lattice and electronic valency transition at 340 K. Recent advances have achieved a lower $VO_2$ phase transition temperature closer to room temperature (about 300 K) via tungsten doping, but with slightly decreased infrared switching performance compared to stoichiometric $VO_2$. Various engineered nano- and/or micro-patterned configurations can be designed with $VO_2$ to address passive radiative cooling. Passive radiative coolers are known to have low solar absorptance simultaneously with high thermal emittance in the atmospheric window of 8 μm-13 μm. This emission window can be satisfied during the metallic phase of $VO_2$, but the main disadvantage of using $VO_2$ is its high and non-transitioning visible to near-infrared (0.3 μm-2 μm) absorption that leads to high solar absorbed energy.

There have been attempts to seek an effective passive radiative cooler with dominant emittance compared to its low solar absorptance. In response to absorption reduction, various engineered optical filters have been introduced, such as block-band photonic multilayers that consist of high- and low-index dielectric materials, a nanoparticle overlayer, high contrast grating (HCG), metalenses and metagratings, hollow triangular structures, and prisms in manipulation of light refraction and reflection in the visible to near-infrared region. Among these photonic approaches, some are diffractive—structures larger than wavelength—and some are at wavelength. As a result, there is a demand for various photonic approaches focusing on prisms and high contrast gratings for their simplicity and effectiveness.

Disclosed herein is a passive thermal switching radiative cooling coating. The coating is structured with a phase transition material. A thermochromic oxide (TCO), such as vanadium dioxide ($VO_2$), can act as the functional thermal switching emitter component, and the infrared-transparent dielectric, such as silicon, is used to construct the high contrast grating (HCG) solar reflector and protective overlayer. A novelty is a double-layer thermochromic oxide that sandwiches a low-refractive index infrared-transparent dielectric cavity (i.e., $BaF_2$, $MgF_2$, KBr). This design achieves record-high emissivity contrast, where high thermal emissivity at hot temperature can be as high as 0.9, and low thermal emissivity at cold temperature as low as 0.1. While HCG is known to reflect irradiation, from the sun for example, this combination of HCG above TCO requires a supporting layer having an optimized proprietary design.

More specifically, this combination of double-layer TCO thermal emitter and high-refractive index HCG allows reflection of low wavelength (high energy) radiation simultaneous with thermal radiation emission switching in tailored wavelength bands, such as the infrared for terrestrial cooling applications. The emissivity switching contrast from cold to hot is record-high, exceeding 0.5. In some embodiments, the coating is independent of the incident angle, and can maintain the same emissivity switching at up to oblique incident angles. In some embodiments, the coating is used in spacecraft applications to regulate heat storage and output, because its operation is in vacuum of space. In microelectronics, the coating can be encapsulated in vacuum-sealed thermal diodes to regulate thermal transport between surfaces. For atmospheric applications, this can benefit thermal comfort of human habitats as a window and roof coating. Moreover, this coating provides switchable functionality with no electrical input or signaling. This functionality can assist in safety mechanisms under sensitive variable temperature components, such as rechargeable batteries and photovoltaic cells.

Microscale prisms can utilize diffractive optics and have been utilized for optical, imaging, and polarization applications. Their mechanism can be modulating the optical path to achieve total internal reflection (TIR). Generally, a remarkable mimicry of this mechanism is observed in the Saharan silver ant's triangular hairs, which keep them cool. Generally, a strategy similar to these ants can be approached to enhance the performance of monolithic radiative cooler coatings. While engineered metasurfaces such as these can be challenging to precisely construct, some at-wavelength and smaller structures provide designs that are easier to fabricate with good precision. An example of sub-wavelength constitutive structures is dielectric multilayers, which in sum can require many stacks of alternating high- and low-refractive index nanometer-scale slabs. Instead, an approach may be to integrate a periodic high-index dielectric structure called a High Contrast Grating (HCG), which can apply waveguide-like near-perfect phase rotation at the incident plane of a high-refractive index dielectric and low-index surrounding in broad wavelengths. The refractive index contrast between the dielectric grating and the surroundings can produces Fabry-Pérot round trip (FP-RT) resonances that can be observed for both one- and two-dimensional gratings.

HCGs have typically been used for various optical applications, such as surface emitting lasers, waveguides, and all-pass filters in requirement of reflectance of greater than 99% in replacement of Distributed Bragg Reflectors (DBRs).

Infrared-transparent silicon and germanium integrated layered prisms and HCG-on-solid dielectric-$VO_2$ layers can be designed to suppress the visible-to-near-infrared absorption. FIG. 1A illustrates the concepts of the simultaneous achievement of solar reflectance and thermal radiation at cold and hot temperatures using $VO_2$. The monolithic $VO_2$ structure alone uses Fabry-Pérot interference with a $BaF_2$ cavity to obtain the high emissive power at the hot state. Silicon and germanium prisms and integrated HCGs are considered due to their high refractive index relative to $VO_2$ for both enabling TIR and at-wavelength phase matching within the dual-band region. The monolithic diffractive optical method and at-wavelength 1D and 2D HCG method can be compared with spectral absorptance and field-space plots. The theory and the mechanism behind this reflectance augmentation in visible-to-near-infrared regions are discussed below.

Figure 1B:
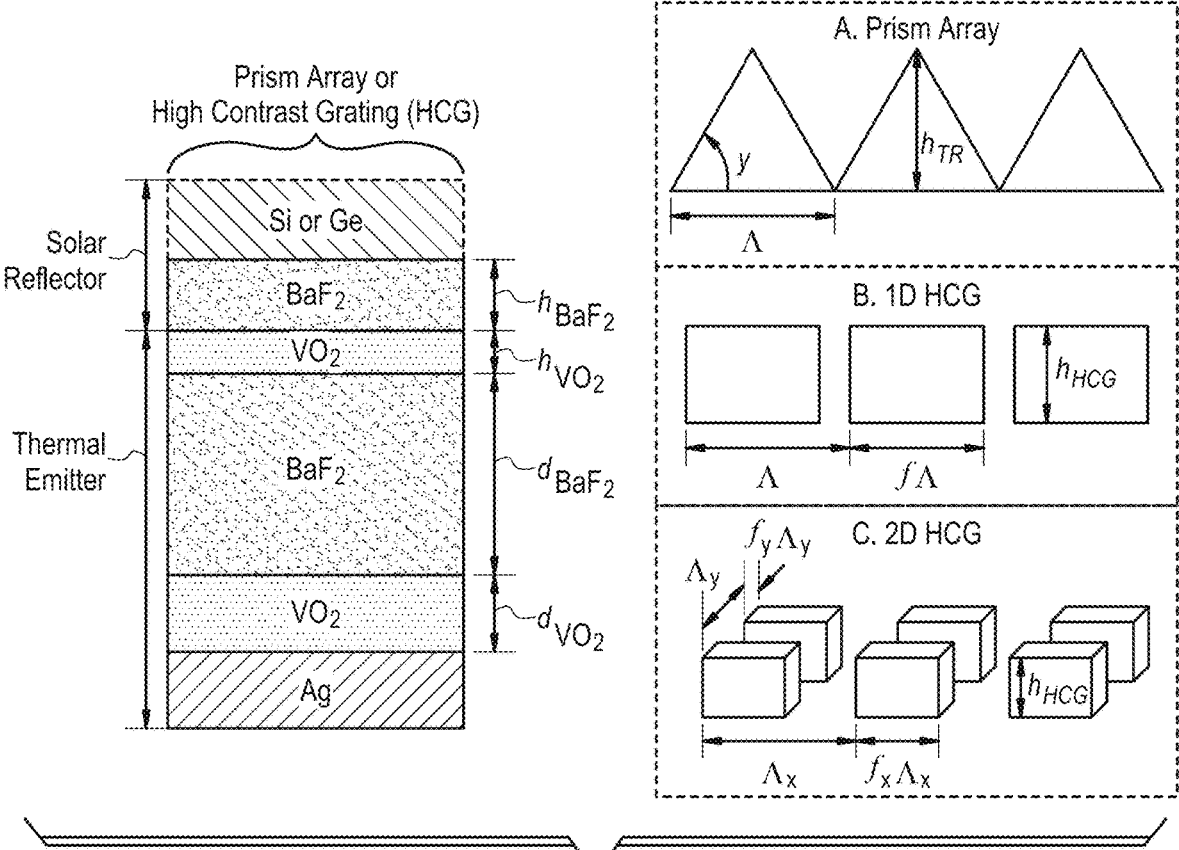
FIG. 1B is a schematic of an embodiment of a Si or Ge prism array or high contrast grating (HCG) on $VO_2(hvo_2)$/ $BaF_2$ $(d_{BaF_2})VO_2(hvo_2)$/Ag (substrate) with a $BaF_2$ spacer. The prism array has a period of $\Lambda$ and edge angle of $\gamma$ with a height of $h_{TR}$. The 1D HCG has a period of A and filling ratio off with a height of $h_{HCG}$. For 2D HCG, $\Lambda_x$ equals $\Lambda_y$ and $f_x$ equals $f_y$.

FIG. 1B shows the schematic Si or Ge prism array or HCG as a solar reflector on the self-adaptive thermal emitter ($VO_2$/$BaF_2$$NO_2$/Ag). The upper $VO_2$ thin film is h equals 35 nm with a low-index $BaF_2$ spacer above it. This mismatched double Fabry-Perot design can minimize absorptance at solar wavelength (0.3 μm-2.0 μm) and maximize high emittance to low emittance contrast in the infrared region (2.0 μm-35 μm). Both wavelength ranges may be selected to meet 5% uncertainty of total figures of emittance, absorptance, and radiative powers. The construction of the latter Fabry-Pérot multilayer can consist of a $BaF_2$ cavity of thickness $d_{BaF_2}$ equals 1.385 μm and a $VO_2$ sublayer of thickness $d_{VO_2}$ equals 0.45 μm.

Some embodiments can be based on the optical cavity resonator for high reflectance at the cold temperature while creating high infrared emittance by constructing the metallic boundaries at temperatures above phase transition. Referring to FIG. 1B, the right side depicts embodiments of three different solar reflectors: (A) prism array, (B) 1D HCG, and (C) 2D HCG. First, the prism array can be an embodiment with an edge angle of γ equals 60° and a period of Λ equals 0.44 for Si and 0.1 μm for Ge with the height of the prism calculated as $h_{TR}$ equals Λ sin(γ)/2 cos(γ). The equilateral prism can be an embodiment to maximize total internal reflection (TIR) while enabling adequate infrared transmission for the materials selected. The low refractive index of the $BaF_2$ underlayer ($h_{BaF_2}$ equals 0.15 μm for Si and 0.24 μm for Ge) compared to the high refractive index dielectric material allows for TIR in the region with a low extinction coefficient of materials.

One-dimensional rigorous coupled-wave analysis (1D RCWA) may be utilized to model the diffractive electromagnetic wave response of the multi-component monolithic layer deposited on silver (Ag). Other metal substrates, such as aluminum and gold, can be used, but with careful selection of the deposition, thermal annealing, and treatment processes. For the spectral reflectance, p(λ), calculations, the prism may be discretized in RCWA into layers with thickness of about 0.01 μm each (35 and 8 layers for Si and Ge, respectively). Lumerical FDTD can be used to verify the electromagnetic field densities and the reflectance spectrum of the prism in the steady-state (t greater than 11 fs) spatial (xz-planar) domain. The dielectric function of evaporative-deposited and thermally oxidized $VO_2$, Si and Ge, $BaF_2$ and Ag can be used.

On the other hand, the period of 1D and 2D HCGs is A equals 0.42 μm and A equals 0.58 μm for, respectively, Si and Ge. For each dielectric HCG, the period is chosen to have multiple Fabry-Pérot round trip (FP-RT) modes, which lie between the dual-mode region (or tri-mode region) for a broader reflectance outside of the region with a high extinction coefficient for Si (A less than 0.6 μm) and Ge (λ less than 1.1 μm). The height of the HCG is set as $h_{HCG}$ equals 0.5Λ for 1D HCG (0.7Λ for 2D HCG) and the filling ratio of the dielectrics as f equals 0.7 ($f_x$ equals $f_y$ equals 0.7). The thickness of the $BaF_2$ underlayer is also optimized to be $h_{BaF_2}$ equals 0.14 μm and for Si, and $h_{BaF_2}$ equals 0.24 μm for Ge. The periods 1D and 2D HCGs can been compared for further understanding of obtaining the near-perfect reflectance at certain wavelengths. Full spectrum calculation is conducted using 1D RCWA63 for 1D HCG and 2D RCWA64 for 2D HCG.

Figures 2A, 2B, 2C, 2D, 2E, 2F:
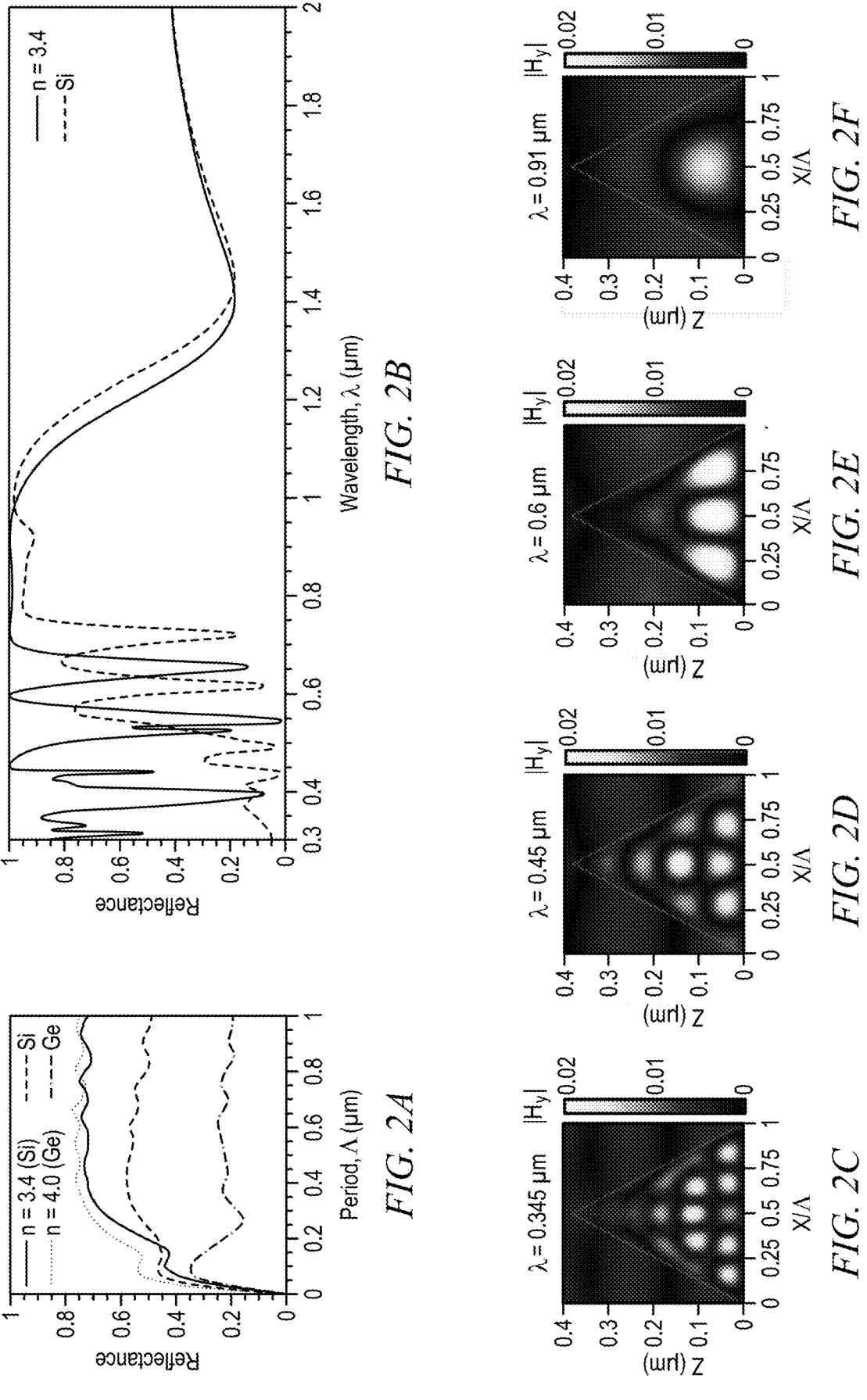
FIG. 2A is a graphical depiction of a relationship between a reflectance and a period of a prism array.
FIG. 2B is a graphical depiction of a reflectance spectrum of the Si prism array. The dashed line represents Si, and the solid line represents Ge.
FIGS. 2C-F are pictorial depictions of magnetic field distributions of TM waves within the Si prism.

The period of the prism array is chosen as $\Lambda$ equals 0.44 µm for Si and 0.1 µm for Ge to avoid the wavelength range with a high extinction coefficient of Si ($\lambda$ less than 0.6 µm) and Ge ($\lambda$ less than 1.1 µm). FIG. 2A represents the relationship between the period and the total reflectance integrated over the solar wavelength range (0.3 µm-2.0 µm). With extinction coefficient $\kappa$ equals the reflectance increases as the period increases for n equals 3.4 and 4.0, which corresponds to idealized Si and Ge. However, for real Si and Ge with a non-zero $\kappa$ value, the reflectance can be diminished for both. The element Ge can be more affected due to a higher $\kappa$ value under the solar spectrum with high solar irradiance intensity. The electromagnetic mechanisms behind the broad reflectance can be obtained by floating the Si prism array. FIG. 2B shows the reflectance spectrum of the lossless Si (n equals 3.4, solid line) and real Si (dash line) floating prism array, which may be surrounded by the n equals 1 medium. The spectrum can be calculated with 1D RCWA for TM waves at normal incidence only. Broad reflectance can be observed in the visible region due to total internal reflection (TIR). To obtain TIR, the critical angle of propagating waves in the prism is obtained using $$\theta_c = \sin^{-1}\left(\frac{n_{BaF_2}}{n_{St\,or\,Ge}}\right), \tag{1}$$

where $n_{BaF_2}$ equals 1.48, ns, equals 3.52, and $n_{Ge}$ equals 4.28 chosen at the wavelength $\Delta$ equals 1.2 µm. The critical angle is $\theta_c$ equals 24.9° and 20.2° for Si and Ge, respectively. The edge angle $\gamma$ of the prism is calculated by the following implicit formula:

$$\theta_{BaF_1} = \gamma - \sin^{-1}\left(\frac{n_0\sin(\gamma - \theta_1)}{n_{St\,or\,Ge}}\right), \tag{2}$$

where $\theta_{BaF_2}$ is the incident angle at the interface of the BaF$_2$ underlayer and a is the incident angle into the prism. $\theta_{BaF_2}$ must surpass the critical angle $\theta_c$ in the wavelength range of 0.3 to 2.0 µm to achieve TIR in the prism array. Therefore, with the condition $\theta_{BaF_2}$ greater than $\theta_c$, the edge angle $\gamma$ greater than 30° according to Eq. (2) can be obtained without the consideration of the extinction coefficient existence. As disclosed herein, $\gamma$ equals 60°, so that TIR occurs from normal incident angle to a equals 30°. Hence, it obtains the reflectance band in the transparent region for Si and Ge for TM waves due to the directionality of TIR. The circular magnetic field distribution is produced for multiple modes at certain wavelengths with reflectance R greater than 0.99, as depicted in FIGS. 2C-2F. Multiple $(m+1)\lambda/2n_{PR}$ show m number of resonant TIR modes within the prism, corresponding to $\lambda$ equals 0.91, 0.60, 0.45, and 0.345 µm for first, a narrowband second, third, and fourth mode, respectively. Note that the last mode does not exist for real Si due to the presence of extinction coefficient ($\kappa$ greater than 0). The absorptance in visible-to-near-infrared can be further reduced if a variety of differently sized prisms is arranged on the low-index substrate to produce TIR at multiple wavelengths.

To resolve the low reflectance in the visible-to-near-infrared region and enhance emittance in the mid-infrared region, a different approach is considered to integrate high contrast grating (HCG) on top of the BaF$_2$NO$_2$/BaF$_2$/VO$_2$/Ag sub-structure. The concept behind 1D HCG is depicted in FIGS. 3A-F. The reflectance contour (TM wave) of a standalone 1D HCG made of n equals 4.0 (corresponds to Ge without extinction coefficient) is depicted in FIG. 3A. HCG is defined as the near-wavelength structure ($\lambda$ about $\Lambda$), whereas the wavelength smaller than the grating period ($\lambda$ much less than $\Lambda$) is defined as diffraction grating, and the wavelength greater than the grating period ($\lambda$ much greater than $\Lambda$) is deep subwavelength grating (single waveguide). Both diffraction and single waveguide resonance modes take place in the HCG regime where reflectance is enhanced (R greater than 0.9) in broadband. From the HCG contour plot, the period of the grating is chosen to be $\Lambda$ equals 0.58 µm with filling ratio as f equals 0.7 and thickness as h equals 0.5$\Lambda$ to obtain broad reflectance within the Ge transparent region. The checkerboard-like pattern is the major characteristic of HCG where two FP-RT resonance modes are present. The contrast between surrounding low-index (n equals 1 for vacuum or air) and high-index (n equals 4 for Ge and n equals 3.4 for Si) gratings enables the complete FP-RT at the interfaces of the high-index gratings at the output plane. Hence, perfect reflectance (R greater than 0.99) is achieved at a wavelength of $\lambda$ equals 1.02 µm and $\lambda$ equals 1.58 µm so that a broad reflectance (R greater than 0.9) is obtained as shown in FIG. 3B. As marked in FIG. 3A, these two points represent the H$_{y2}$ and H$_{y0}$ modes, which are mathematically extracted by solving the eigenvalues of the FP-RT eigenequation. The eigenequation is expressed by $$M(\lambda, h)\begin{bmatrix} A_0 \\ A_2 \end{bmatrix} = |Q|e^{i\phi}\begin{bmatrix} A_0 \\ A_2 \end{bmatrix}, \tag{3}$$

where M is the RT propagation matrix, A$_j$ is the eigenmode expansion coefficients, and $|Q|e^{i\phi}$ is the eigenvalues. The phase condition $\phi$ being multiples of $\pi$ so that c equals 2 m$\pi$(m equals 0, 1, 2, 3 . . . ). Hence, solving for the eigenvalues leads to distinguishment of H$_{y2}$ and HA (for TM waves). By defining the boundary between the incidence region and input plane as I-II and output boundary as the matrix M is described with reflectance matrix R$_{I-II}$ and R$_{II-II}$ as $$M(\lambda,h)=R_{I-II}e^{i\beta h}R^{II-III}e^{i\beta h}, \tag{4}$$

where $\beta$ is the longitudinal propagation constants of the eigenmodes.

Thus, the dual-mode region is provided with $\beta$ equals 0 whose cut-off wavelengths are $\lambda/\Lambda$ equals 1.72 and $\lambda/\Lambda$ equals 3.75 for n equals 4.0 ($\lambda/\Lambda$) equals 1.47 and $\lambda/\Lambda$ equals 3.18 for n equals 3.4). With the given geometric parameters, two resonance modes are present at $\lambda$ equals 1.02 and 1.58 µm with the R>0.99 condition, where it is sandwiched by H$_{y2}$ and H$_{y0}$ resonances that meet FP-RT conditions. One can have half round trips within the 1D HCG as shown in FIGS. 3C and 3E where it consists of both single waveguide mode (A$_0$) and even-mode (A$_2$). The mode transitions from H$_{y2}$ and H$_{y0}$ when observing from the output plane to the input plane. Therefore, both the top and bottom of magnetic field H$_y$ wavefronts are observed at the center of the 1D HCG due to half-RT. Another has only one-RT because it is only sandwiched by the H$_{y0}$ fundamental mode such that only one circular internal field is present as shown in FIGS. 3D and 3F. These two modes are the lowest modes present for the lowest possible thickness of the high-index 1D HCG. By increasing the thickness, multiple modes are present for both H$_{y2}$ and H$_{y0}$ with a narrower band of reflectance, which worsen the absorptance in the visible-to-near-infrared region. Therefore, broad reflectance is obtained at a thickness of h equals 0.5Λ for 1D HCG.

In contrast to 1D HCGs, 2D HCGs have both TM and TE contributions. In consequence, it squeezes the dual-mode region to a narrower band compared to 1D HCGs and creates an additional tri-mode in the visible-to-near-infrared region. In some embodiments, the period in the x-direction and y-direction is taken as the same such that $\Lambda_x$ equals $\Lambda_y$ and the height is taken as h equals 0.7 $\Lambda_x$ to obtain broader reflectance. The reflectance contour as depicted in FIG. 4A of standalone 2D HCG with n equals 4.0. The dots correspond to the combination of FP-RT modes present in 2D HCG within and outside of the tri-mode region, namely, $EH_{22}$, $EH_{20}$, and $EH_{00}$, which is the hybrid mode of TM and TE waves. The third mode, which is excited due to an additional degree of freedom, $EH_{22}$ is similar to the $EH_{00}$ mode where it splits band with respect to both the thickness and wavelength of HCG so that it creates disorganized checkerboard patterns compared to 1D HCG in the tri-mode region. The patterns in the dual-mode region remain the same if the refractive index of the grating is higher than the surroundings. The checkerboard patterns differ when air holes are created within the high-index material. Thus, three modes can coexist when the band is surrounded with three RT conditions. The RT matrix for 2D HCG is expressed by $$M(\lambda, \Lambda_x) \begin{bmatrix} A_0 \\ A_2 \\ A_4 \end{bmatrix} = |Q| e^{i\phi} \begin{bmatrix} A_0 \\ A_2 \\ A_4 \end{bmatrix}, \tag{5}$$

where the additional eigenmode expansion coefficient $A_4$ corresponds to the $EH_{22}$ mode. Outside of the tri-mode is the multiple-mode region, where various circular magnetic and electric field distributions can be obtained. At the point just outside the tri-mode region, it consists of both $EH_{22}$ and $EH_{20}$ modes as shown in FIGS. 4C and 4F. The sharp reflectance is obtained in the visible region, which corresponds to the single $EH_{20}$ mode. $EH_{20}$ is very much similar to that of the $H_{y2}$ mode whose field distribution is comparable with FIGS. 3C and 3E. The narrowband reflectance created by the additional $EH_{22}$ mode has a mix of $EH_{20}$ and $EH_{00}$, which produce disorganized destructive interferences, as observed in FIGS. 4D and 4G. The narrowband reflectance can also be formed in 1D HCG when the $H_{y0}$ mode is excited in shorter wavelength, and this corresponds to the $EH_{22}$ mode in 2D HCG. Similarly, $EH_{00}$ is identical to the $H_{y0}$ mode as illustrated in FIGS. 4E and 4H and FIGS. 3D and 3F, respectively. The symmetry of the magnetic field distribution is maintained for both 1D and 2D cases. Note that dispersion equation formulation of 2D HCG is still not conducted because the prediction of these FP-RT modes in 2D is complicated as can be seen in the reflectance contour. Regardless of the multiple reflectance bands obtained in 2D HCG, Ge cannot produce multiple reflectance bands in the visible region as shown in the upper figure of FIG. 4B due to its high κ value.

To maximize the functionality of an integrated switchable thermal emitter and solar reflector with either a prism or a high contrast grating (HCG) array, an idealized thickness low-index underlayer is necessary. FIGS. 5A and 5C depict the correlations of absorptance and underlayer thickness where the low-index material (BaF₂) diminishes absorptance to allow total internal reflection (TIR) within the prism and Fabry-Pérot round trips (FP-RTs) in HCG. This is due to the large index contrast at the interface at the output plane of the prism and the grating.

The transmitted electric field is reflected from the thermal emitter via the $BaF_2$ underlayer to further assist in enhancing the reflectance while the array in direct contact with the $VO_2$ substrate disturbs the resonance modes' excitation. Note that Ge has less effect of underlayer because its high extinction coefficient disables the high reflectance in the visible region. On the other hand, the emittance in the mid-infrared region has a small effect of $BaF_2$ and n equals 1 underlayer, maintaining the turn-down of the emissive power, whereas high index Si and Ge significantly diminish emittance at the hot state as shown in FIGS. 5B and 5D. The thickness of the $BaF_2$ underlayer is chosen as $h_{BaF_2}$ equals 0.15 μm (0.24 μm for Ge) for the Si prism and $h_{BaF_2}$ equals 0.14 μm (0.24 μm for Ge) for Si HCG.

As depicted in TABLES I and II, a comparison of total absorptance and emissive power at the hot state ($P_{hot}$) and cold state ($P_{cold}$), and total normal emittance difference ($\Delta\varepsilon$) is provided:

TABLE I

| Solar reflector | Si or Ge | Λ (μm) | $h_{BaF_2}$ (μm) | Total Absorptance |
|---|---|---|---|---|
| Prism Array | Si | 0.44 | 0.15 | 0.582 |
| | Ge | 0.10 | 0.24 | 0.560 |
| 1D HCG | Si | 0.42 | 0.14 | 0.500 |
| | Ge | 0.58 | 0.24 | 0.558 |
| 2D HCG | Si | 0.42 | 0.14 | 0.572 |
| | Ge | 0.58 | 0.24 | 0.685 |
| No solar reflector | | | | 0.753 |

TABLE II

| Solar reflector | Si or Ge | $P_{350K}$ (W/m²) | $P_{300K}$ (W/m²) | $\Delta\varepsilon$ |
|---|---|---|---|---|
| Prism Array | Si | 690 | 74 | 0.682 |
| | Ge | 696 | 68 | 0.703 |
| 1D HCG | Si | 693 | 70 | 0.695 |
| | Ge | 671 | 73 | 0.660 |
| 2D HCG | Si | 701 | 69 | 0.707 |
| | Ge | 722 | 72 | 0.726 |
| No solar reflector | | 667 | 62 | 0.681 |

As depicted in FIGS. 6A, 5C, and 5E, the absorptance spectrum averaged between TM and TE polarized waves of the integrated solar reflector/thermal emitter passive cooling coating is represented. The at-wavelength absorptance reduction can be obtained for the prism array on the substructure since TIR is directional that broad reflectance in the visible-to-near-infrared region occurs only in the TM wave. Instead, HCG has broader reflectance compared to the prism array design because of the existence of dual-mode FP-RT in shorter wavelengths for 1D HCG with $h_{HCG}$ equals 0.5Λ. An extra mode is introduced for 2D HCG, which splits this into tri-mode and dual-mode regions. The broad reflectance due to the dual mode becomes narrower compared to 1D HCG, and $h_{HCG}$ equals 0.7Λ is chosen for 2D HCG to broaden the reflectance band. The location of absorptance is different for Si and Ge because the period of HCG is designed to avoid the high extinction coefficient in the region. In contrast, the emittance spectrum is maintained almost the same with the structure without the solar reflector as depicted in FIGS. 6B, 6D, and 6F. This is because Si and Ge are highly transparent in the mid-infrared region, which does not disturb the incoming light to the standalone thermal emitter portion ($VO_2/BaF_2$, $VO_2/Ag$).

Tables I and II depicted above show the radiative performance comparison of all three solar reflectors for Si and Ge on the thermal emitter with varying thickness $BaF_2$ spacers. The total absorptance is given as $$\alpha = \frac{\int_{0.3\,\mu m}^{2\,\mu m} \alpha(\lambda) I_{AM1.5}(\lambda) d\lambda}{\int_{0.3\,\mu m}^{2\,\mu m} I_{AM1.5}(\lambda) d\lambda}, \tag{6}$$

where $I_{AM1.5}$ is the Earth solar irradiance. The emissive power P as a function of graybody temperature T and total normal emittance E are defined by:

$$P_T = \int_{2\,\mu m}^{35\,\mu m} \varepsilon_T(\lambda) E_{BB,T}(\lambda) d\lambda, \tag{7}$$

$$\varepsilon_T = \frac{\int_{2\,\mu m}^{35\,\mu m} \varepsilon_T(\lambda) E_{BB,T}(\lambda) d\lambda}{\int_{2\,\mu m}^{35\,\mu m} E_{BB,T}(\lambda) d\lambda}, \tag{8}$$

where $E_{BB}$ is the Planck blackbody radiation, and temperature T is 300 and 350 K for cold and hot states, respectively. The Si HCG broad transparency of Si and broad reflectance gained from HCG. This is 34% absorptance reduction from the thermal emitter only structure. The Si 1D HCG still can maintain a high emissive power of 671 $W/m^2$ in the metallic phase due to solid $VO_2$ (35 nm) and sub-$VO_2$ layer (450 nm) that produce interferences between Fabry-Pérot $BaF_2$ cavities. This compares with a solar absorptance of 0.447 obtained from the multilayer $VO_2$ structure with an emissive power of only 271 $W/m^2$. It also surpasses the performance of design with $VO_2/Si/A_1$ whose absorptance is 0.647 and power is 429 $W/m^2$. The 2D HCG design does not perform well because it produces three resonance modes in a certain wavelength range instead of two which worsen the reflectance in the region compared to 1D HCG. In some embodiments, the contrast in infrared emittance $\Delta\varepsilon$ equals $\varepsilon_{hot}$ minus $\varepsilon_{cold}$ remains high around 0.66 to 0.726 compared to the coating without reflector array. The prism array structure, on the other hand, is highly dependent on polarization (TM or TE). This narrows down the reflectance band. Overall, Si 1D HCG can achieve both low solar absorptance and simultaneously demonstrate infrared transparency to guide the design of a self-adaptive radiative cooling coating.

Generally, three solar reflectors made of high-index dielectrics, such as silicon and germanium, combined with a thermal emitter ($VO_2/BaF_2/VO_2/Ag$) with the $BaF_2$ underlayer can be in some embodiments. In some embodiments, suppressing the absorptance obtained from vanadium dioxide ($VO_2$), which has a high extinction coefficient in the visible-to-near-infrared region, may be accomplished. The prism array design can rely on total internal reflection (TIR) within the prism, which produces at-wavelength reflectance due to the polarization dependency. On the other hand, the high contrast grating (HCG) utilizes the Fabry-Perot round trip (FP-RT) resonances to gain the broadband reflectance in the visible-to-near-infrared region. Both one-dimensional and two-dimensional HCGs are demonstrated for comparison, and it is shown that 2D HCG did not overcome the performance in 1D HCG due to squeezing of the dual-mode region and the introduction of an additional resonance mode. The low-index underlayer is introduced to have TIR and FP-RT to show that refractive index contrast between the prism or the grating and the surroundings can be significant, but also to augment the overall reflectance, which is assisted from the thermal emitter. The Si 1D HCG design is shown to have the lowest absorptance compared to other structures. Regardless of the design of the solar reflector, the emittance at hot and cold states is maintained because of solid $VO_2$ sandwiching the $BaF_2$ Fabry-Perot cavity. Therefore, both the prism and HCG have great impact in solar absorptance suppression while maintaining the high emissive power in terms of photonics and physics behind the reflectance enhancement. These devices are aimed to be used for self-adaptive passive radiative cooling under sunlight on rooftops, vehicles, and buildings.

In some embodiments, the optimized structure is easily feasible for nano- and micro-fabrication, for large scale-produced flexible radiative cooling blankets. In some embodiments, a high turn-down grating by computational optimization of horizontally oriented $VO_2$ nanowires placed on a thin film. The material $VO_2$ has a phase transition temperature at 340 K, where the phonon-electron structure transforms from insulating to metallic at temperatures above this transition temperature. By randomized trials of at- and sub-wavelength deposited $VO_2$ nano- and micro-features, a periodic $VO_2$ nanowire array and a solid $VO_2$ monolayer that sandwiches a quarter-wave thick lossless dielectric. Fabricated $VO_2$ nanowires, typically of 50 nm-150 nm in diameter are used demonstrating the breakdown on the Franz-Wiedemann law in thermoelectricity. These nanowires can be fabricated through a vapor transport method, a bottom-up method, and these $VO_2$ nanobeams can be laid and aligned in-plane, compared to the top-down photolithography and etching processes for traditional at-wavelength gratings. This bottom-up method can greatly reduce complexity in fabrication, where minimal coating thickness is needed.

A Monte-Carlo optimization method can obtain a nanowire array period and width of square cross-section $VO_2$ nanowires. This method can be applied to obtain the $VO_2$ monolayer as well, which may serve as a gradual index anti-reflection layer above the fully-reflecting silver substrate. The broadband reflectance or broadband emissivity turn-down performance is quantified with a turn-down performance figure-of-merit (FOM), and compared with other $VO_2$ phase transition passive thermal radiation self-cooling coatings. A trade-off survey of alternative dielectric spacers is performed, and the coating's radiative cooling ability is evaluated under 24-hour terrestrial thermal conditions. In some embodiments, the proposed monolithic structure has a total thickness of a few microns above a silver substrate. In some embodiments, the coating on a flexible polymer backing sheet can be applied to alleviate the loss in efficiency for solar cells, whose temperatures can be as high as 80° C. in summers under highly irradiative climates, such as Texas. The flexible coating can be applied to one or both sides of a vacuum gap between a solar cell housing and the roof. Similarly, it can be utilized for cooling compact processor components that gets as warm as 80° C. to 100° C. Other usages include thermal management for lithium-ion battery cell casings, passive-switched spacecraft insulation blankets, and other common Earth-temperature thermal regulation applications.

In some embodiments, Rigorous Coupled-Wave Analysis (RCWA), a well-established multilayered diffraction method to solve Maxwell equations may be utilized to calculate the optical radiative properties of the optimized periodic coatings. The materials and geometrical parameters of the coating in some embodiments is shown in FIGS. 1C-1D: the grating has a period of Λ, nanowire width of w, nanowire height of h, distance between nanowires b, thickness of the lossless dielectric is du, and thickness of the VO$_2$ sub-monolayer is d$_{VO_2}$. Initially, the nanowire aspect ratio can be non-square to demonstrate possible effects.

In some embodiments, the desirable high reflection or high emission properties, selection of optical parameters can tailor its optical parameters. The contrast of the dielectric layers can help construct an anti-reflecting coating, where each transparent layer satisfies the geometric mean of the surrounding layers' real component of refractive indices, such that n$_1$=√n$_0$n$_2$. The underlying totally reflecting metal substrate can vary among aluminum, silver, gold, and others that are opaque and reasonably produced at sub-micron thickness. The anti-reflecting layer thicknesses can also satisfy quarter-wave law, such that h=λ/4n. This quarter-wave method can be widely used to determine broadband reflectance at certain wavelength range known as Bragg reflector, where high- and low-refractive index materials are stacked into multilayers with quarter-wave thickness.

In some embodiments, high emittance Fabry-Perot resonance condition is formed by constructive interference of electromagnetic waves within a low-absorption dielectric spacer sandwiched by metallic thin-films. These metallic boundaries can be infinitesimally thin and lossless to enable transmission into the cavity, and yet promotes étalon resonance as light interferes within the cavity. This dimension can produce effective transmittance, and effective reflectance at moded frequencies. The former condition is sought at Wien displacement corresponding far-infrared wavelengths at terrestrial temperatures. Realistically, the metal boundaries around a Fabry-Perot cavity are lossy and result in non-unity transmittance or reflectance—which is why figure-of-merit optimization can favor intermediary mechanisms.

Figure 7A:
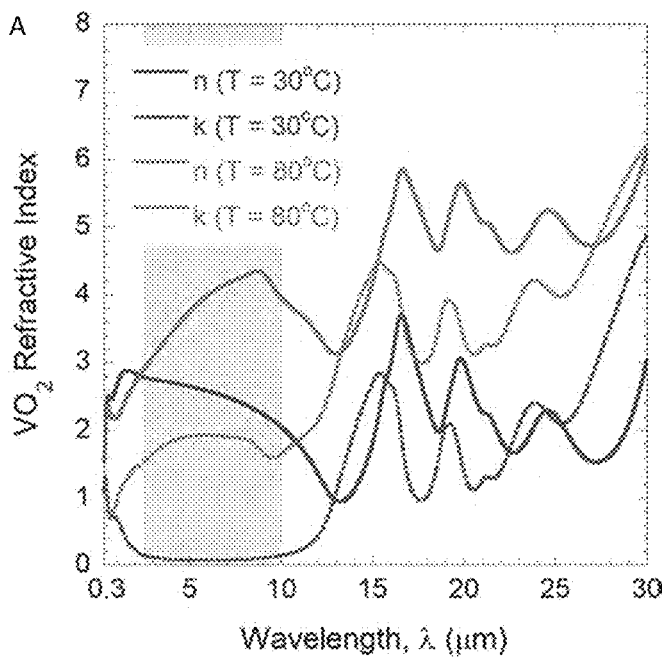
FIG. 7A is a graphical depiction of refractive index of vanadium dioxide ($VO_2$) at T equals 30° C. and T equals 80° C. The highlighted region shows near-zero extinction coefficient of the refractive index ($\kappa$) at the cold state.

For periodic anisotropic grating features at the sub-wavelength, such that A can be much less than λ, effective medium theory (EMT) can be applied to capture the optical properties of gratings as expressed by a single layer composed of a filling ratio φ weighting of the dielectric functions. The dielectric function of VO$_2$ thin films made by physical vapor evaporation and oxygen treatment are obtained from empirical spectroscopy of its thin films. Its optical properties are expressed with an effective medium and Fermi-Dirac-like distribution as shown:

$$\tilde{n}_{VO_2}^{0.6} = \tilde{n}_i^{0.6}(1-f) + \tilde{n}_m^{0.6}f \tag{1}$$

$$f = \frac{1}{1 + \exp\left[\frac{W}{k_B}\left(\frac{1}{T} - \frac{1}{T_b}\right)\right]} \tag{2}$$

where n$_i$ and n$_m$ is the refractive indices for insulator and metal VO$_2$ respectively. W equals 3.37 eV is width of the temperature range of metal-insulator transition. The partial monoclinic-to-rutile lattice phase transition occurs at T$_h$ equals 78.5° C., where at this temperature, 50% of VO$_2$ is metallic. Thus, the onset transition temperature of VO$_2$ from insulator to metal is 68° C. In FIG. 7A, the imaginary part of the refractive index in VO$_2$ for the cold state is close to zero in the mid- to far-infrared (about 4 μm to about 10 μm). This infrared transparent region is highlighted in gray, and can play an important role in low absorption. On the other hand, it is highly absorbing in the visible and the deep far-infrared region.

Figure 7B:
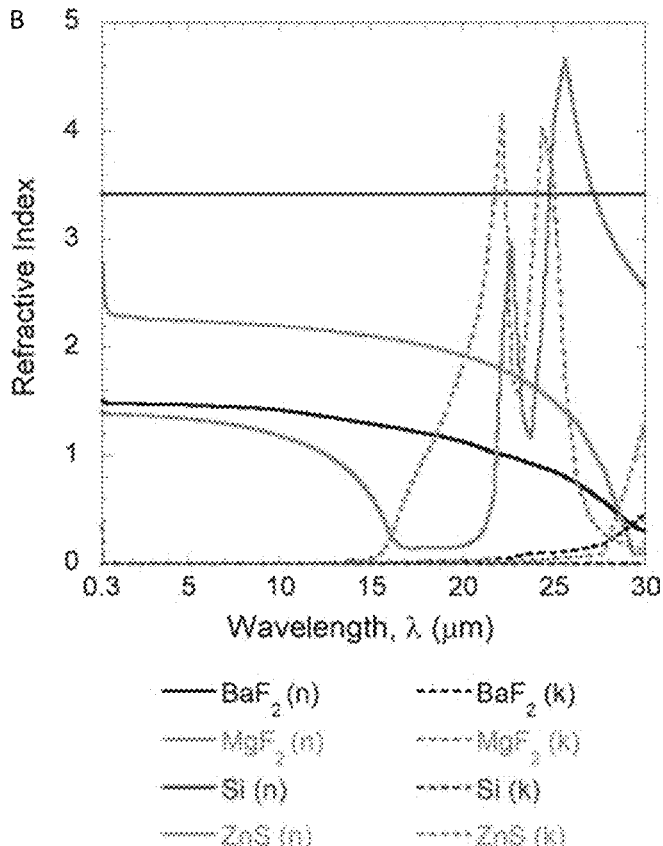
FIG. 7B is a graphical depiction of a comparison of refractive index of dielectric materials, including barium fluoride ($BaF_2$), magnesium fluoride ($MgF_2$), silicon (Si), and zinc sulfide (ZnS).

As shown in FIG. 7B, there are a few broadly infrared-transparent dielectric candidate materials that can be utilized as the dielectric spacer. These include barium fluoride (BaF$_2$), zinc sulfide (ZnS), and silicon (Si). The commonly available silicon has broadly constant refractive index of around n equals 3.4, with no extinction coefficient provided undoped low number density and optical quality. High index Si would also allow for the thinnest Fabry-Perot cavity via the quarter-wave law. For BaF$_2$ and ZnS, the refractive index is lower, but have absorption component in far infrared region, due to the Reststrahlen effect of gaps in the upper level electron bands. The lower refractive index may be appreciated in the arrangement of anti-reflection gradient index of layers. The compound MgF$_2$ can also be a candidate as suggested in other turndown coating designs. However, the compound MgF$_2$ has a significant absorption near the Reststrahlen band, which may result in reduction in the performance of radiative properties. Insulators with absorption in infrared wavelengths up to 30 μm is usually avoided, as a wavelength window cutoff in the upper limit leaves more than 10% of Planck radiation unaccounted at atmospheric temperatures. The balance of broad infrared transparency and close to unity refractive index should be considered.

The parameter optimization scheme is conducted by creating four arrays of random N numbers, r$_j$, for randomizing Λ, b, h, and d$_{VO_2}$. The arrays consisting of random numbers can then be used to produce random value of size arrays for those four parameters as: Λ=Λ$_0$±r$_1$Λ$_0$, b=b$_0$±r$_2$b$_0$, h±r$_3$h$_0$, and d$_{VO_2}$=d$_0$±r$_4$d$_0$. Candidates with b greater than A are rejected. The N combinations of candidates are created and evaluated with the following figure-of-merit (FOM), $$FOM = \frac{R303}{R353} = \frac{\int_{0.3\,\mu m}^{30\,\mu m} \rho_{\lambda,303}E_{BB,303}d\lambda}{\int_{0.3\mu m}^{30\mu m} \rho_{\lambda,353}E_{BB,353}d\lambda} \tag{3}$$

where p$_\lambda$ is the spectral reflectivity, and E$_{BB,T}$ is the spectral emissive power which expressed as E$_{BB,T}$ equals πI$_{BB,T}$, where I$_{BB,T}$ equals (4π$^2$c$_0^2$h/λ$^5$)/[exp (2πhc$_0$/λk$_B$T)−1] is the blackbody intensity at the corresponding temperature T The wavelength is integrated from 0.3 μm and 30 μm, which covers adequate sampling of the blackbody spectrum at atmospheric temperatures up to the solar spectrum. The FOM is based on ratio of coating reflected power to normalize from the opaque metal substrate, for sake of FOM comparison with other configurations on other metal substrates. The spectral emissivity is calculated as ε$_\lambda$ equals 1−ρ$_\lambda$, considering that Kirchhoff s law of radiation is satisfied as substrate is thick enough to be opaque. By fitting the parameter inputs into this summative FOM metric, further parametric stipulations can be applied to the next round of optimizations as explained below. Because the optimization consists of four parameters to randomize, N=10$^4$ candidates are sufficient to search for the optimal structure. Yet optimizing more parameters can require additional samples, but recent machine learning techniques such as Bayesian optimization may be implemented in the future for its adaptive learning of suitable parameters with reasonable convergence.

In some embodiments, BaF$_2$ is chosen as the dielectric spacer and d BaF$_2$ is quarter-wave thickness set constant as $\lambda_0/4_{nBaF2}$=1.385 µm. The center wavelength $\lambda_0$ is chosen as 8.2 µm, corresponding to Wien displacement emissive power distribution at 80° C. (hot condition). The cold condition is selected to be 30° C., a typical warm day or summer night in Texas. BaF$_2$ has a low index of approximately $n_{BaF_2}$ equals 1.5, which contrasts highly against VO$_2$. The compound BaF$_2$ is preliminarily selected as the lossless dielectric due to its broad essentially zero imaginary component of the refractive index up to the Reststrahlen absorption peak near 50 µm. The dielectric function of Ag is drude-like with plasma constants and that of BaF$_2$ can be obtained.

In some embodiments, the VO$_2$ sub-monolayer can have a thickness at $d_{VO_2}$ equals 450 nm via trials. The thickness is thinner than the anticipated quarter-wave thickness of $\lambda_0$)/$4n_{VO2}$ equals 840 nm, where $n_{VO2}$ equals 2.38 at $\lambda$ equals 8.2 µm. The maximized FOM can be quite broad over N equals $10^4$ samples, with no random scattering of outliers. Deviations of a few tens of nanometers from this value remains high performance. In some embodiments, an optimal filling ratio of VO$_2$ nanowire-to-period ($\phi$ equals w/$\Lambda$), the range can be narrowed between 0.4 to 0.6. Thus, a reasonable additional restriction can be applied to the optimization method where the width of the VO$_2$ nanowire cross-section may be equal to the nanowire height. Optimizations of rectangular nanowires may not result in additional maximization of FOM. Square cross-section VO$_2$ nanowires with high length-to-width aspect ratios can be realized for nanoscale applications. This round of optimizations may be conducted with the aspect ratio restrictions, resulting in the best optimized structure with parameters: $\Lambda$ equals 194 nm, b equals 114 nm, w equals h equals 80 nm, $d_{BaF_2}$ equals 1.385 µm, and $d_{VO_2}$ equals 0.450 µm. Some embodiments correspond to FOM=1.47, meaning that the emitted thermal radiation at high temperature exceeds that emitted at low temperature. A high FOM remains along smaller periods and widths, but drops steadily beyond 250 nm and 150 nm. A so-called Pareto frontier was observed where the FOM decreases linearly at about −1 per 1 µm increase for $\Lambda$, and per 0.5 µm increase for w. As a result, nanowires of a few nanometers wide can be difficult to reliably produce or manipulate experimentally, so that the optimization sought the largest parameters without sacrificing performance.

Figure 8A:
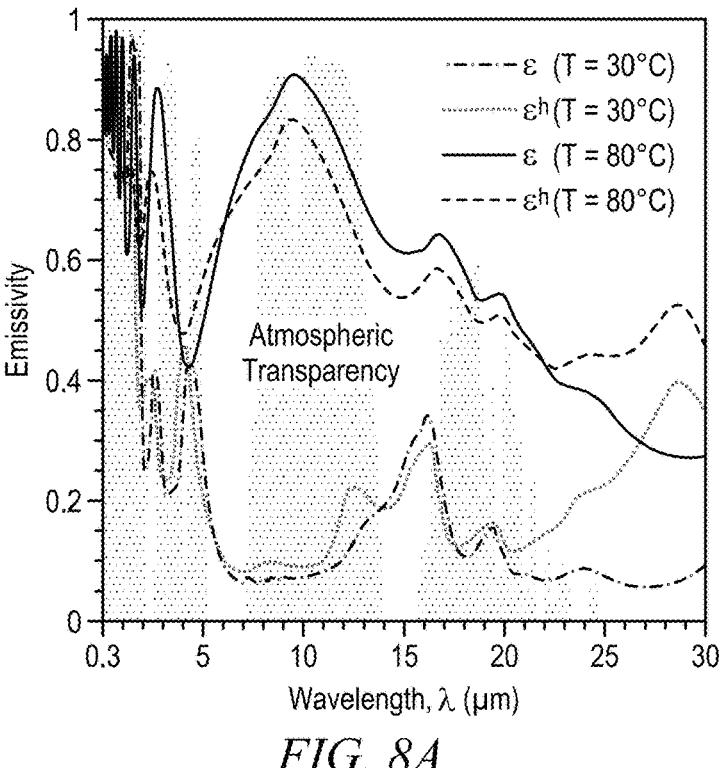
FIG. 8A is a graphical depiction of the averaged emissivity spectrum of the optimized $VO_2$ nanowire, $BaF_2$, and $VO_2$ on Ag coating calculated with rigorous coupled-wave analysis (RCWA). The dashed lines show the hemispherical emissivity spectra. The background atmospheric transparency spectrum is also depicted.

FIG. 8A shows the averaged spectral emissivity between TM- and TE-polarized waves calculated by RCWA. In some embodiments, the emissivity switches between low emissivity and high emissivity as the temperature increases across the transition temperature. The emissivity in the visible range, translated to solar absorptivity, is unavoidably high at any temperature, as there is a bandgap transition in VO$_2$. Meanwhile in the infrared region, the region corresponding to the extinction coefficient flip can overlap with the atmospheric transparency window (inverse of clouds on a warm day near 290 K). Referring to FIG. 7A, the thermal radiation turndown mechanism can show the large difference of extinction coefficient $\kappa$ between 30° C. and 80° C. as observed in the highlighted gray region of the spectrum. Additionally, the hemispherical emissivity ($\varepsilon^h$) across all polar incident angles and averaged electromagnetic wave polarizations depict small differences compared to the normal emissivity, except for the far-infrared region beyond 25 µm. This is attributed to some minor absorption due to the off-quarter-wave thickness attenuation length from a slightly lossy BaF$_2$ as it approaches its Reststrahlen band discussed further below.

Figure 8B:
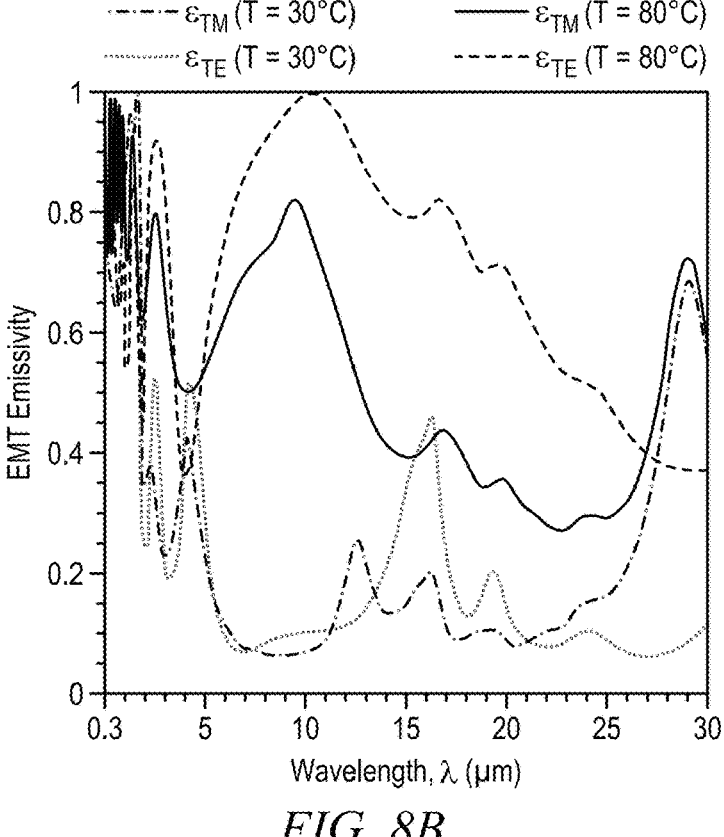
FIG. 8B is a graphical depiction of the normal emissivity spectrum calculated with effective medium theory (EMT) applied to the optimized $VO_2$ nanowire array, for TM wave (solid line) and TE wave (dotted line).

The normal polar incident angle emissivity in transverse magnetic (TM) and transverse electric (TE) wave calculated in effective medium theory (EMT) are shown in FIG. 8B, showing drastic differences. This is due to the anisotropic complex (n) effective refractive indices in the respective ordinary (TM) and extraordinary components (TE), expressed by:

$$\bar{n}_{TM} = \frac{\bar{n}_{VO_2}}{\sqrt{(1-\phi)\bar{n}_{VO_2}^2 + \phi}} \tag{4}$$

The formula (5) is expressed:

$$\bar{n}_{TE} = \sqrt{\phi\bar{n}_{VO_2}^2 + (1-\phi)} \tag{5}$$

where $\phi$ is the nanowire volume-to-period filling ratio for the gratings, assuming the surrounding medium is air/vacuum of index $n_0$=1.0. This formulation of effective medium theory is valid for uniaxial structures with characteristic dimensions w and h are much smaller than the characteristic wavelength $\lambda$, for which the thermal radiation wavelengths satisfy. The resulting real component of the effective refractive indices of the optimized coating VO$_2$ NW array are $n_{TM}$ equals 1.3 and $n_{TE}$ equals 1.7 at 30° C. ($\lambda$ equals 8 µm). The average of the two indices is $n_{VO2,EMT}$ equals 1.5, matching closely to that of the BaF$_2$ cavity index. Numerically, this allows the Fabry-Perot reflectance condition to be satisfied where the Fresnel reflection and transmission coefficients at normal are $r_{12}$ equals 0 and $t_{12}$ equals 1. The even smaller $\kappa_{eff}$ at 30° C. in the transparency wavelength region further supports the calculation of near-zero or unity coefficients. In this configuration, the total normal emissivity is very low at c equals 0.11 in the cold state and c equals 0.68 in the hot state.

On the other hand, the breaking of Fabry-Perot reflectance at this half-phase shift mode appears when 80° C. VO$_2$ presents a much higher refractive index in both real and imaginary parts for both the nanowire effective medium and the sub-monolayer. For instance, at $\lambda$ equals 8 µm, $n_{TM}$ equals 1.3 and $n_{TE}$ equals 3.6, while $\kappa_{TM}$ equals 0.009 and $\kappa_{TE}$ equals 2.1. The higher indices in the TE polarization are expected due to the dispersion along the axial nanowire slabs. A maximum emissivity of $\varepsilon_{TE}$ equals 0.997 at $\lambda$ equals 10.5 µm can be observed, which may be ascribed to the near-zero Airy formula reflectance into the multilayered film ($R_{1234}$). Using the penetration depth equation $\delta$ equals $\lambda/4\pi\kappa$, the attenuation coefficient in TE polarization results in $\delta_{TE}$ equals 0.31 µm. Yet, the attenuation in the sub-monolayer is greater, as $\kappa_{VO2}$ equals 3.3, resulting in $\delta VO_2$=0.19 µm, much less than the sub-monolayer thickness of 0.45 µm. This equates to radiative absorption and emission of 91% just within the sub-monolayer. Therefore, the thickness of the sub-monolayer is a function of sufficiently high hot state absorption penetration depth, rather than the excessively thick layer provided by the cold state quarter-wave equation.

Referring to FIG. 9, the underlying mechanisms of the turn-down coating's near-idealized performance are investigated and shows the emissivity calculated by RCWA as a function of both incident angle and wavelength. The results show the high turn-down performance of emissivity between cold and hot cases for both TM and TE waves. The hemispherical emissivity switches from $\varepsilon^h$ equals 0.14 to $\varepsilon^h$ equals 0.61 from the cold to hot state. This is especially true near $\lambda$ equals 10 µm, as the normal and broadly oblique emissivity switches from near-zero to near-unity. The emissivity in the TM wave is slightly suppressed to due to the extinction coefficient in the effective medium extraordinary polarization being close to zero for higher temperature. On the other hand, the contrast in TE wave polarization is higher due to the switch between insulating and metallic dispersion along the nanowire. In essence, the axial dispersion along the nanowire offers the highest contrast in the TE polarization, while maintaining good transmittance overall due to the sparsity of interactions of electric fields along the nanowire cross-section. Interestingly, the high emissivity observed at the far-infrared region for TM wave polarization is not present for TE wave polarization. Angular and spectral calculations using EMT formulations of the $VO_2$ NW layer are also able to capture the polarization-dependent emission properties. The electromagnetic field density localizations can demonstrate such trends and differences.

Figures 10A, 10B:
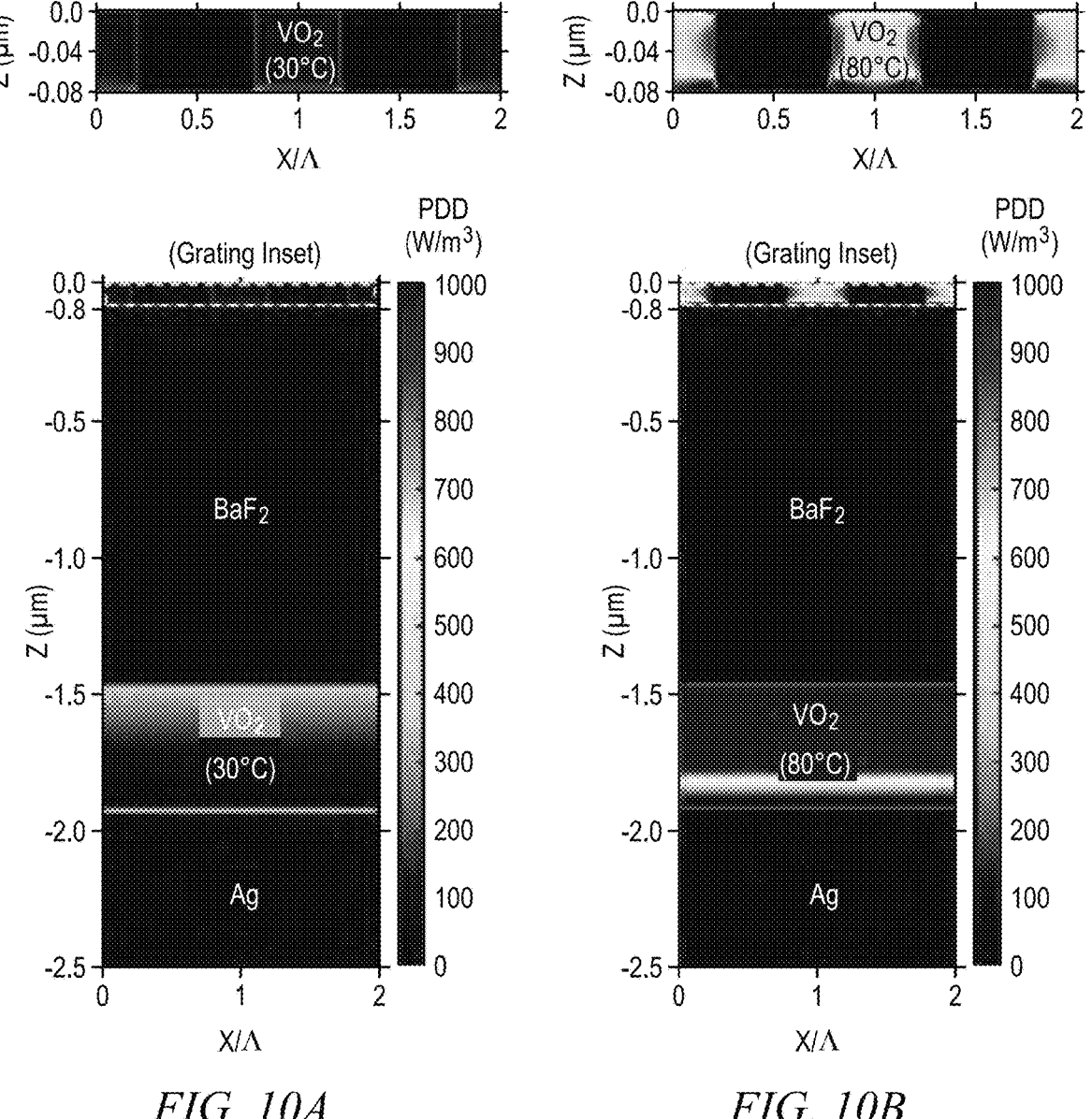
FIGS. 10A-B are graphical depictions of power by dissipation (PDD) (TM wave only) of optimized $VO_2$ NW, $BaF_2$, and $VO_2$ design for (A) a cold state (T equals 30° C.) and (B) a hot state (T equals 80° C.) calculated by RCWA. The white dashed box shows the inset figures within the $VO_2$ nanowire array region. The dashed lines delineate the interfaces in the structure.

Referring to FIG. 10, the power dissipation density (PDD) are plotted between cold and hot states. PDD in $W/m^3$ is given by, $$PDD = \varepsilon_0 \omega n \kappa |E|^2 \qquad (6)$$

where w is the angular frequency corresponding to the wavelength, and E is the local electric field as function of the x-z plane. Referring to FIG. 10A, the mechanism behind the high reflectance in the cold state is due to graded refractive index from top to bottom. As the nanowire width becomes infinitesimally small, the FOM plateaus close to 1.5. This makes sense as the $VO_2$ layer seeks to obtain a refractive index close to unity. The spectra calculated with an 80 nm-thick effective nanowire medium can result in the same normal emissivity, with discernable differences of off-normal spectra due to the anisotropic effective medium distribution. The refractive index of the sub-monolayer $VO_2$ is $n_{VO2}$ equals 2.38, which is a gradual transition to higher index before the reflecting and opaque silver substrate. The power is concentrated in a sliver at the interface between the $VO_2$ sub-monolayer and silver. The penetration depth in the silver substrate is 11 nm, almost negligible. Some absorption is seen in $VO_2$, and none through the $BaF_2$ dielectric cavity layer, as the fields are transmitted in the cold state. Because the extinction coefficient of $VO_2$ is non-zero ($\kappa$=0.08 at 8 µm) in the transparency region shown in FIG. 7A, the reflection is not precise. This 5.7% $VO_2$ monolayer thickness to its penetration depth ratio is expressed correspondingly in the minimum emissivity at 8 µm shown in FIG. 8A.

On the other hand, as depicted in FIG. 10B, the electromagnetic field power dissipation density (PDD) within the $VO_2$ nanowire and $VO_2$ bottom layer at the hot state temperature demonstrates higher absorption compared to lower temperature due to its much higher $\kappa$ value of 3.3. Localization of power absorption can be up to 1,000 $W/m^3$ in both $VO_2$ layers. In the hot state, the 450 nm-thick $VO_2$ sub-monolayer becomes to the absorbing metallic substrate, such that the lossless dielectric insulator cavity becomes a Fabry-Perot resonator. This plasmonic resonance is induced within the nanowire and within the $VO_2$ sub-monolayer due to its metallic phase, behaving like metal-insulator-metal (MIM). The finesse in this optimized design is due to the upper metal layer being a loosely packed thin metal film or semi-metal, such that enough radiation can enter the dielectric cavity and constructively interfere to induce maximum absorption by the sub-monolayer $VO_2$. This design switches from anti-reflecting coating by refractive index gradient-layering to an optimally leaky yet metallic boundary nanowire array around a plasmonic resonant cavity that concentrates power absorption density within the $VO_2$ sub-monolayer for maximal emission in the coating's hot state.

Figures 9A, 9B, 9C, 9D:
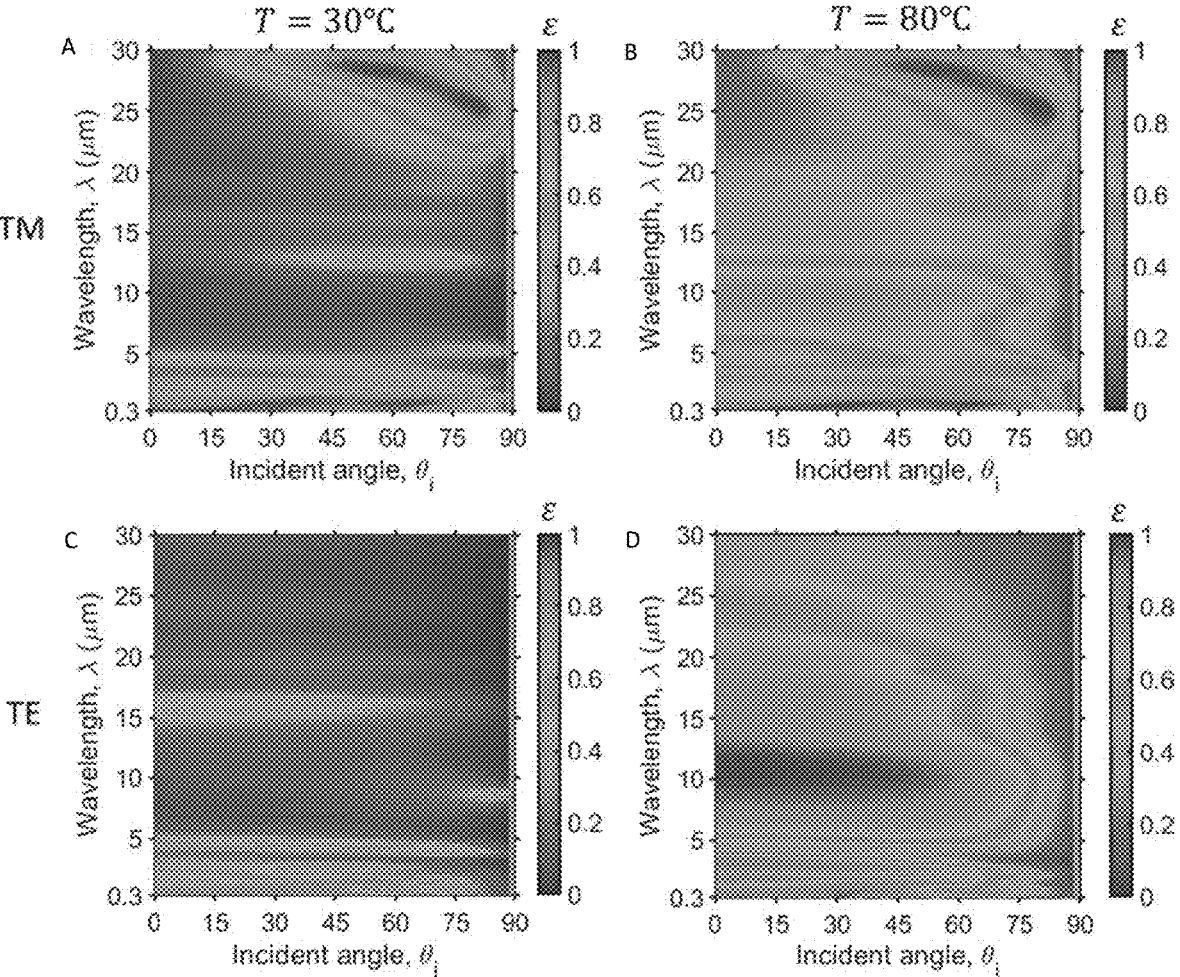
FIGS. 9A and 9B are spectral and incident angle-dependent emissivity contours of TM wave at A cold and B hot states, calculated by Rigorous Coupled-Wave Analysis (RCWA).
FIGS. 9C and 9D are spectral and incident angle-dependent emissivity contours of TE wave at (c) cold and (d) hot states, calculated by RCWA.
Figure 11A:
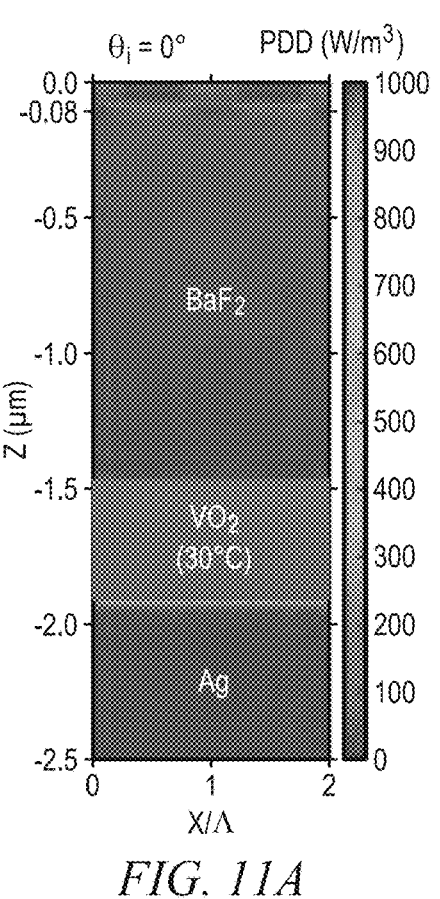
Figure 11B:
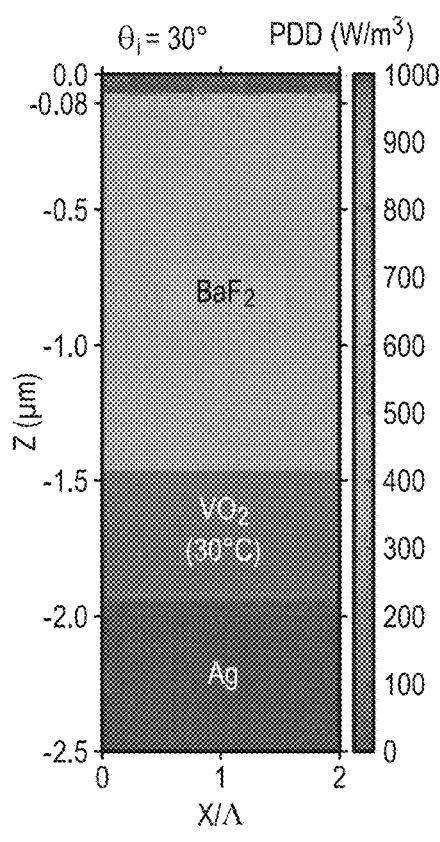
Figure 11C:
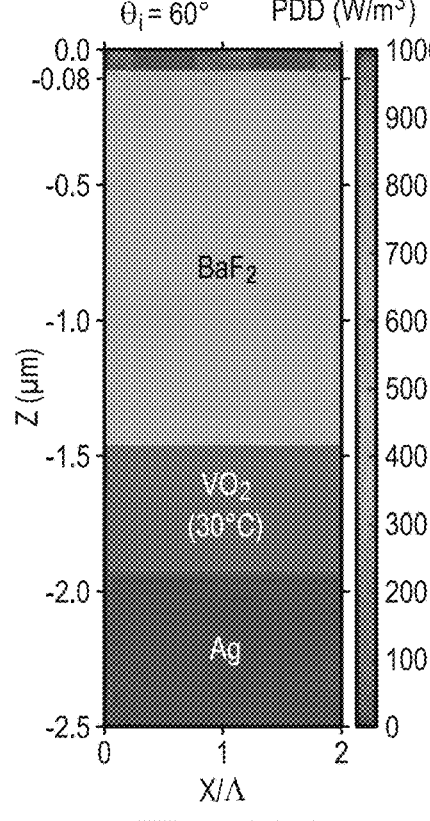

Although many optical materials and coatings should perform well regardless of radiation incident angle, some angular dependence is observed at far infrared region at around 28 µm. Referring to FIG. 11, the anomalous high absorption marked by the TM wave "lobes" in FIGS. 9A and 9B are further investigated. The absorptive effect is due to a thick $BaF_2$ layer, where spectral emissivity increases with incident angle and reaches up to 1.0 at higher angles due to increasing value of $\kappa$ value and propagation length. Neither the silver substrate nor the $VO_2$ components have effects on the oblique angle emissivity. The incident far infrared light is trapped in the slightly lossy cavity and constructs multiple reflections between $VO_2$ NW and $VO_2$ sublayer. This phenomenon is only observed in TM waves at oblique incident angles, as the electric fields form surface plasmon modes at the lower corners of the dielectric $VO_2$ nanowires. The emissivity is further enhanced at hot state, FIGS. 11D-11F, because metallic phase in $VO_2$ absorbs the light, especially the under-cavity monolayer. At steeper angles, emissive power is then concentrated within $BaF_2$ cavity, as the mechanism transitions toward cavity extinction and trapping. In practice, this angle-dependent emissivity in cold state can be avoided to improve its overall performance with radiation coming from any polarization type. With this consideration of the Reststrahlen band extinction of this particular infrared material, other dielectric materials should be considered as replacement, as discussed below.

Figures 12A, 12B, 12C, 12D:
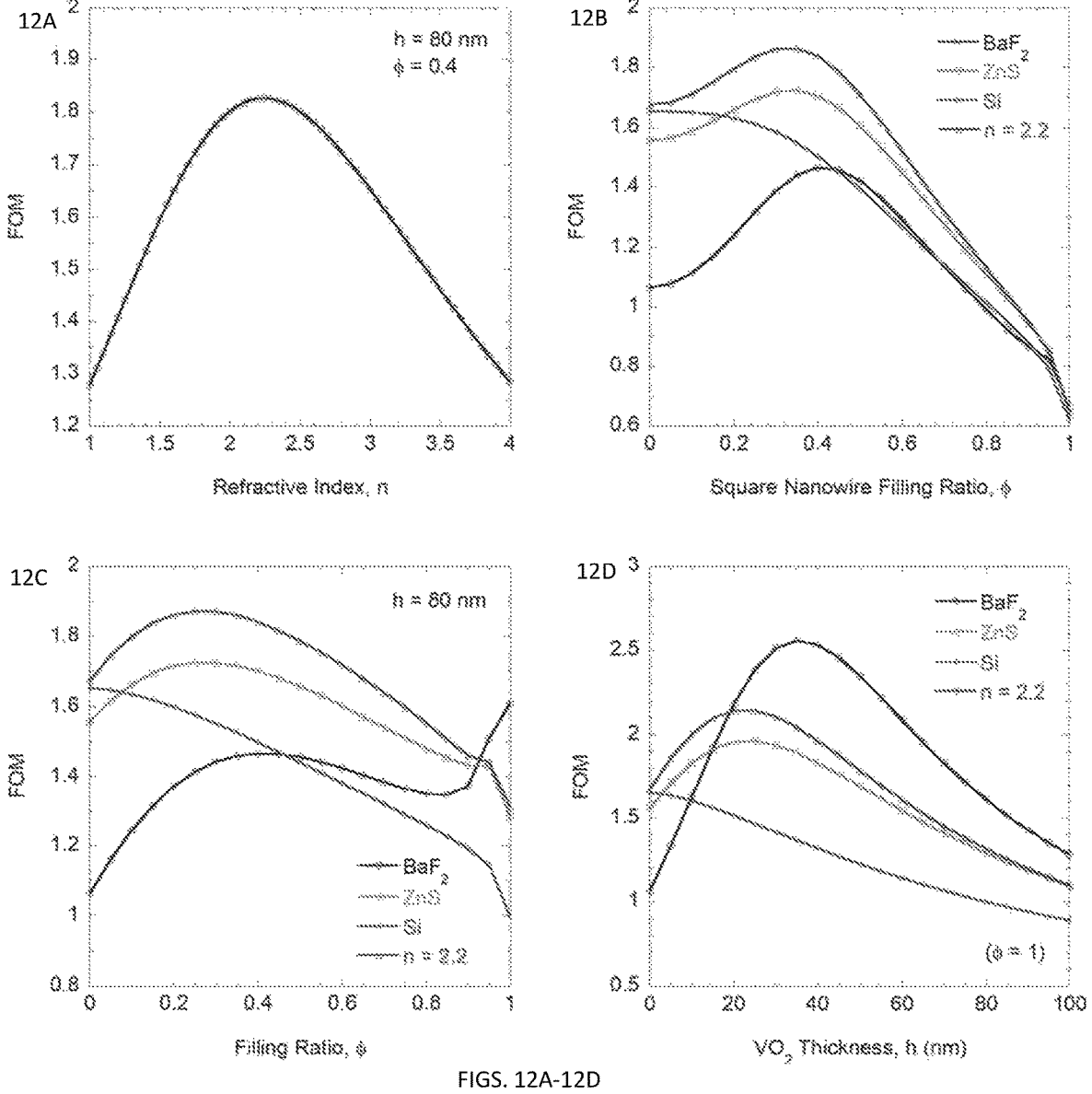
FIG. 12A is a graphical depiction of a relationship with of FOM and the refractive index of a quarter-wave thick spacer.
FIG. 12B is a graphical depiction of a correlation layer of FOM and a filling ratio of $VO_2$ square (w=h) nanowires.
FIG. 12C is a graphical depiction of a correlation layer of FOM and a filling ratio of $VO_2$ with h equals 80 nm.
FIG. 12D is a graphical depiction of a correlation layer of FOM and a thickness of top $VO_2$ solid layer ($\phi$ equals 1) with different real dielectric materials including $BaF_2$, ZnS, Si, and idealized dielectric of constant n equals 2.2.

As depicted in FIG. 12A, a sweeping of a correspondingly quarter-wave thick layer of purely real component and wavelength-independent refractive indices from unity to Germanium (n=4.0) is shown. The $VO_2$ parameters are unchanged from the previously-found optimized configuration. Here, a higher FOM performance is determined by an idealized dielectric spacer of refractive index n equals 2.2. This FOM can be as high as 1.86, slightly higher compared to the optimized structure with $BaF_2$ of 1.47. In this regard, other broadly infrared-transparent materials with higher index such as silicon (n equals 3.4) can achieve similar turn-down performance. Other low-index materials can have similar FOM as the $BaF_2$ configuration, such as potassium chloride (n equals 1.49) and potassium bromide (n equals 1.45), as long as the Reststrahlen band is far beyond the thermal infrared regime ($\lambda$ greater than 40 µm). Medium-index materials such as zinc selenide (n equals 2.4) or zinc sulfide (n equals 2.2) can deliver FOM greater than 1.47. Crystalline and interfacial compatibility between these medium-index dielectrics with $VO_2$, especially with stoichiometric chemical growth methods, are sought. Difficulties may arise in more common dielectric oxides with medium-index, such as silicon dioxide or titanium dioxide, due to their Lorentz absorption in the mid- to far-infrared.

Referring to FIGS. 12B and 12C, the filling ratio of the $VO_2$ NW array can serve a role in high reflectance in cold state due to index-matching between the $VO_2$ NW and air effective medium (EMT) layer and the dielectric material. The compound $BaF_2$ can reach a maximum at $\phi$ equals 0.4, but it is not true for the other dielectric materials. The highest FOM is achieved for both ZnS and the constant n equals 2.2 index at $\phi$ equals 0.3 when the $VO_2$ NW is fixed as a square (w equals h), as initially optimized. The slightly lower FOM of ZnS compared to constant n equals 2.2 is due to its closer Reststrahlen band peak at 30.5 µm. For a high-index dielectric such as Si (n equals 3.4), the best filling ratio of the $VO_2$ NW array is zero, which is unrealistic. This is due to the departure of gradient refractive index matching because $VO_2$ cannot attain an index as high. On the other hand, if the shape constraint of the NW into rectangular is relaxed, but with fixed h equals 80 nm, ZnS and the n equals 2.2 dielectric can have similar FOM at even smaller filling ratios compared to the square NW configuration. In some embodiments, only $BaF_2$ produces the highest FOM at filling ratio close to ϕ equals 1, due to the close to unity emissivity in hot temperature state while minimally increasing the emissivity in the cold state. At ϕ=1, with $BaF_2$ cavity, ε=0.24 when cold and ε=0.75 when hot.

Referring to FIG. 12D, the solid $VO_2$ top layer can be surveyed, where the thickness can be found to be thinner to obtain FOM maxima. For example, ZnS and n equals 2.2 dielectric should have thicknesses near h equals 20 nm. It is correlated that the volume of the highest FOM case for $BaF_2$, h equals 35 nm, corresponds exactly to the solid volume (6.4 $\mu m^3$) occupied by 80 nm wide square $VO_2$ NW at ϕ equals 0.4. These equivalent thicknesses also correspond to the near-zero Airy formula reflectance. The variation in spectral emissivity plots with thickness are also shown. While the solid $VO_2$ thin film-integrated coatings are uniaxial, so that TM and TE polarization are the same, high emissivity in the deep far-infrared due to off-normal absorption shown in FIG. 11 is not as evident. The angular and wavelength-dependent emissivities for $BaF_2$ and n equals 2.2 ideal thickness cases can be illustrated showing the similar turn-down performance as the optimized coating. The local maximum peak FOM achieved for NW occupying the same volume can optimize the $VO_2$ NW parameters. This may be verified with calculations of FOM corresponding to a 3D cubic grating of $VO_2$ that occupies the same solid volume per areal period. The dielectric spacer analysis for $VO_2$ layers can become too thin for reliable physical deposition and addition of oxygen, an equivalent filling ratio of wider NW array can achieve similar turn-down performance.

Fabry-Perot cavity types over others, provide all dielectrics with equal ease of deposition, purity, and interface compatibility with $VO_2$. The cavity dielectric materials can be categorized into three types: (1) low-index material ($n_D$ less than $n_{VO2}$) requiring high volume $VO_2$ top layer, (2) medium-index material ($n_{VO2}$ less than or equal to $n_D$) requiring lower $VO_2$ volume, and (3) high-index material ($n_{VO2}$ much less than $n_D$) which does not provide peak FOM at any filling ratio or thickness. Among these, the higher $n_D$, the thinner the cavity layer, which may be beneficial for coating thickness consideration. Other dielectric spacers not considered have been used in other turn-down coatings utilizing $VO_2$, which are compared below. Few works have explored asymmetric semi-metal-insulator-metal configurations, let alone ones that have anisotropic optical properties. Hence, there is desire for formulations of more complex yet application-yielding nanostructures.

Figures 13A, 13B:
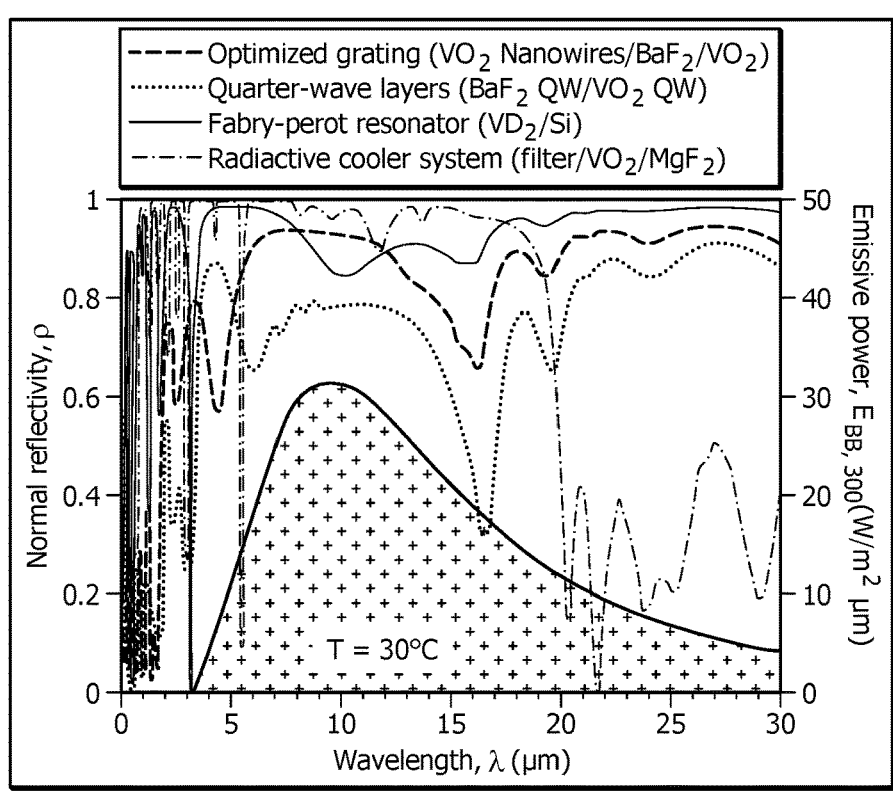
FIG. 13A is a graphical depiction of comparison of a normal reflectivity of an optimized coating ($VO_2$ nanowires/$BaF_2$/$VO_2$), simple quarter-wave layers of $BaF_2$ QW/$VO_2$, QW), a Fabry-Perot resonator of $VO_2$/Si), and a radiative cooler system of band-pass filter/$VO_2$/$MgF_2$. All are opaque coatings on metal substrates. The Planck blackbody emissive power functions ($E_{BB}$) at 30° C. and 80° C. for reference are in shaded gray.
FIG. 13B is a graphical depiction of comparison of a normal emissivity spectra of an optimized coating ($VO_2$ nanowires/$BaF_2$/$VO_2$), simple quarter-wave layers of $BaF_2$ QW/$VO_2$ QW), a Fabry-Perot resonator of $VO_2$/Si), and a radiative cooler system of band-pass filter/$VO_2$/$MgF_2$. All are opaque coatings on metal substrates. The Planck blackbody emissive power functions ($E_{BB}$) at 30° C. and 80° C. for reference are in shaded gray.

Referring to FIGS. 13A and 13B, the reflectance at cold state and the emissivity at the hot state are compared of the optimized structure ($VO_2$ nanowires/$BaF_2$/$VO_2$) with a rudimentary quarter-wave layers (QWL) as first-order approximation ($BaF_2$ QW/$VO_2$ QW), a FabryPerot resonator (thin $VO_2$ and Si), and a multi-component radiative cooler system (multilayer band-pass filter, $VO_2$, and $MgF_2$). The QW layers are presented to demonstrate its comparable high coating transmissivity as a proof of an anti-reflecting film, similar to the optimized nanowire structure in the cold state. The Planck emissive power spectrum at 80° C. is also posed to predict the total emissivity between the different configurations. Table I compares the summative radiative performances. The FOM of the optimized structure is 1.47, higher than other realized structures of 0.86 and 0.6, respectively. The basic quarter-wave layers that share the same material composition as the optimized structure has a higher FOM of 1.06. The absence of the semi-metallic upper nanowire array layer produces no cavity mode interference, but shares a peak local emissivity near 8 μm. The key understanding is the absence of the upper solid $VO_2$ layer for the purpose of creating a Fabry-Perot cavity in turn reduces performance, especially the required high reflectance in the cold state. Thus, the $VO_2$ nanowire array is a good compromise in gaining the high turn-down, while competing Fabry-Perot configurations have lower turn-down performance due to narrower band emission. Comparison of performance among similar $VO_2$ turn-down coatings, showing the FOM defined in Eq. (3), the emitted radiation flux ($W/m^2$) from the coating ($E_{emit}$), and the net radiative heat flux between the coating and atmosphere at 290 K (q"net) is depicted in TABLE 3 below.

TABLE 3

| Structure | FOM | $E_{emit}$ | | $q"_{net}$ | |
|---|---|---|---|---|---|
| | | 30° C. | 80° C. | 30° C. | 80° C. |
| Optimized Coating ($VO_2$ Nanowires/$BaF_2$/$VO_2$) | 1.47 | 53 | 560 | 27 | 396 |
| Quarter-Wave Layers ($BaF_2$ QW/$VO_2$ QW) | 1.06 | 31 | 443 | 20 | 330 |
| Fabry-Perot Resonator ($VO_2$/Si) | 0.86 | 34 | 359 | 18 | 265 |
| Radiative Cooler System (Filter/$VO_2$/$MgF_2$) | 0.60 | 61 | 202 | 17 | 144 |

Some consequential differences in performance in the multi-component Fabry-Perot cooler system from recalculations is probably due to absorption by $MgF_2$ near its Reststrahlen band near 20 μm, as well as differences from more modern spectroscopic surveys of $VO_2$ thin films. Additionally, Table 3 compares the quantities of radiative heat emitted to the surroundings. The emitted power at normal incidence is given by:

$$E_{emit} = \int_{0.3\,\mu m}^{30\,\mu m} \varepsilon_{\lambda,T} E_{BB,T} d\lambda \qquad (7)$$

where this quantity represents the potential to emit to a neighboring reradiating surface, such as a multilayer insulation blanket. The error to these figures is no more than 10% due to the upper wavelength cutoff at room temperature and above. The integrated hemispherical emissivity combined with absorption from atmospheric radiation, is given by, $$q_{net}^0 = \int_{0.3\,\mu m}^{30\,\mu m} \varepsilon_{\lambda,T}^h E_{b,T} d\lambda - \int_{0.3\,\mu m}^{30\,\mu m} (1 - \tau_{atm,\lambda}) \varepsilon_{\lambda,T}^h E_{BB,T_{amb}} d\lambda \qquad (8)$$

where $\tau_{atm,\lambda}$ is the atmospheric transparency shown in FIG. 8A. The ambient temperature $T_{amb}$ is assumed to be 290 K. Presenting this combined net radiative flux can assess the respective coatings' performance exposed to diffuse cloudy or night sky. By analyzing Eq. (7), the optimized structure produces 560 $W/m^2$ in the hot state, while just 53 $W/m^2$ in the cold state. This ratio of power turn-down is 10.6:1. An even higher turn-down ratio is seen with Eq. (8), for net hemispherical heat flux with atmosphere, where the ratio is 14.7:1. The magnitudes of the hot state emissive power is not insignificant compared to the maximum irradiative power flux from the sun (about 1400 W/m²). The net radiative performance of comparable structures also show good turn-down but at predicted lower hot state magnitudes.

Although the emissive power turn-down ratio for the simpler QW layers is higher (14.3:1), the maximum emitted power is lower, therefore the reduced FOM. This FOM accounts for both the turn-down ratio as well as the emissive power difference between hot and cold state. A higher magnitude emissive power at the hot state can therefore be more impactful, especially for compact components with small radiating surface areas. The optimized VO₂ NW design can also provide dense thermal radiative energy directed toward the atmosphere, almost doubling the capability for radiative rejection compared to other designs. Furthermore, the basic quarter-wave structure can outperform a Fabry-Perot solid VO₂ layer on dielectric. This means the concept of a Fabry-Perot structure may not be best suited, compared to a simpler dual anti-reflection layer. The performance can be bolstered by absorption within the dielectric medium at off-normal incident angles. At these emissive power magnitudes at high temperature, these coatings may be capable of passive radiative cooling under the sun via careful tuning of spectral response in the visible wavelength.

The possibility of the optimized coating can be assessed as a daytime radiative cooler, and the metrics developed to quantify this capability. The coating radiative power flux, $P_{coat}$ in W/m² may be obtained by hemispherical integration of the spectral directional emissivity with the Planck blackbody distribution of the coating. The atmospheric power flux can be calculated with the diffuse atmospheric transparency spectrum seen in FIG. 8A, and integrated with the spectral directional absorptivity at ambient temperature ($P_{atm}$). This quantity can be different than $E_{emit}$ from Eq. (7). The AM1.5 solar absorption spectrum from $IAM_{1.5,\lambda}$ at normal incidence spectral absorptivity can be obtained, as the coating can be mechanically dialed to be sun-pointing ($P_{sun}$). Lastly, environmental heat loss due to both convection and conduction to constant ambient temperature can be grouped into an overall coefficient h, which may be conservatively set as 10 W/m²·K. The combined power from this component is $P_{con}$ equals $h_c(T_{coat}$ minus $T_{amb})$. The integration cutoff for solar irradiation at the lower wavelength of 0.3 μm gives 3% error, compared to the 9% error for the 30 μm upper limit in bodies at terrestrial temperatures. Therefore, the cooling power, $P_{total}$ is calculated as, $$P_{total} = P_{coat} - P_{atm} - P_{sun} + P_{con} \quad (9a)$$

$$P_{coat} = \int_0^{2\pi} \int_0^{\pi/2} \int_{0.3\mu m}^{30\mu m} \varepsilon_{\lambda,\theta,T_{coat}} \cos\theta\sin\theta d\lambda d\theta d\varphi \quad (9b)$$

$$P_{atm} = \int_0^{2\pi} \int_0^{\pi/2} \int_{0.3\mu m}^{30\mu m} (1-\tau_{atm,\lambda})\varepsilon_{\lambda,\theta,T_{coat}} E_{BB,t_{amb}} \cos\theta\sin\theta d\lambda d\theta d\varphi \quad (9c)$$

$$P_{sun} = \int_{0.3\mu m}^{30\mu m} \varepsilon_{\lambda,T_{coat}} I_{AM1.5} d\lambda \quad (9d)$$

$$P_{con} = h_c(T_{coat} - T_{amb}) \quad (9e)$$

where, ψ is the azimuth angle.

Figure 14A:
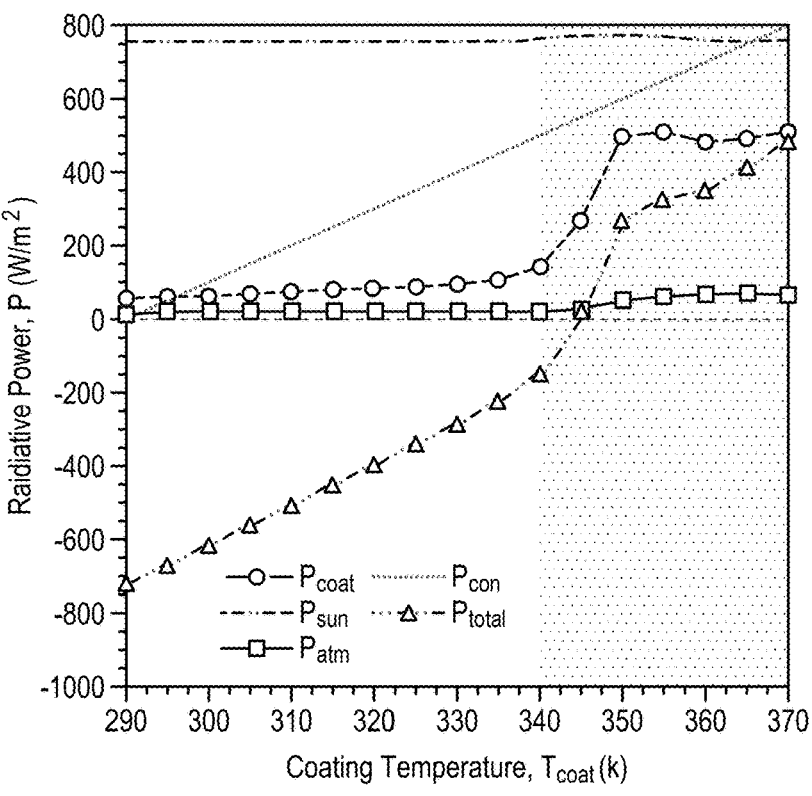
FIG. 14A is a graphical depiction of radiative cooling power, $P_{total}$, and the temperature of the coating (solid circle). The open circle, open square, diamond, and solid lines represent power contributions from the coating, surrounding atmosphere at 290 K, solar irradiation, and combined conduction and convection with overall co-efficient 10 $W/m^2 \cdot K$, respectively. The shaded area represents the metallic phase of $VO_2$.

Referring to FIG. 14A, plotting the total radiative outgoing power with temperatures from ambient to 370 K, an equilibrium temperature is reached around T equals 345 K($P_{total}$ equals 0) which is just above the phase transition temperature of VO₂ at 340 K. The radiative cooling power drastically increases after passing the VO₂ phase transition temperature, and it can attain powers up to 470 W/m². This is similar to the net radiative cooling power at hot state in Table 3. The performance somewhat leans on the contribution of combined convection and conduction cooling power, in which a well-insulated environment around the coating may mean less cooling capability at the hot state. Therefore, the coating is able to reach self-equilibrium near the phase transition temperature of VO₂. In the insulating phase near ambient temperature, the coating warms up, but in the metallic phase at high temperatures, it passively cools.

Figure 14B:
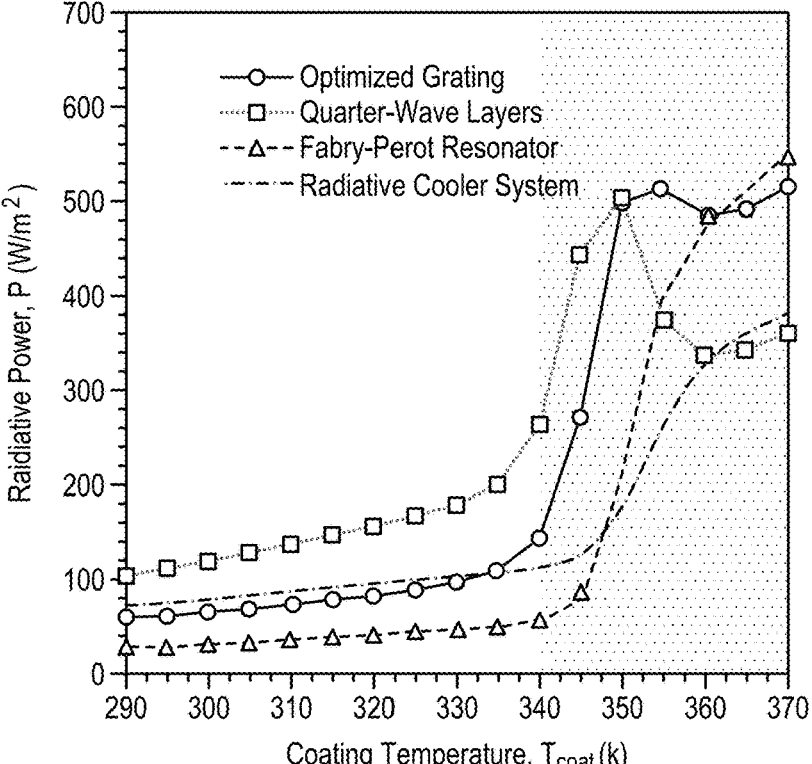
FIG. 14B is a graphical depiction of comparative cases from Table 3 of coating emissive powers, $P_{coat}$ showing the turn-down effect as $VO_2$ transitions phase above 340 K.

Referring to FIG. 14B, the comparative coatings' radiative cooling powers, $P_{coat}$, are graphically depicted. The optimized grating (VO₂ NW, BaF₂, and VO₂) shows lower radiative power below the phase transition temperature, but its large radiative power turn-down ratio at the edge of the phase transition, $P_{rad,350\ K}/P_{rad,300\ K}$ equals 7.56 exceeds that of the others. Their ratios are 4.23, 6.84, and 2.17 for QWL, Fabry-Perot resonator (FPR), and VO₂-multilayer radiative cooler system (RCS) respectively. Due to larger volume of VO₂ constructed in the optimized structure ($V_{VO2}$ equals 506 nm·m²) and QWL ($V_{VO2}$ equals 840 nm·m²), a more rapid $P_{coat}$ increase occurs just above the transition temperature of 340 K. The slight decrease in Pc oat of the optimized grating in metallic phase is due to its red-shifting center wavelength, $\lambda_0$, farther from the peak of the temperature-corresponding Planck blackbody distribution. The FPR and RCS have slower $P_{coat}$ transition because of their smaller $V_{VO2}$ equals 25 nm m 2 and 10 nm·m², respectively. Counter to the quicker cooling response, the configurations of larger $V_{VO2}$ have higher absorption power under the sun, $P_{sun}$, so that it decreases the overall radiative cooling power, Aural. The sunlight absorption from AM1.5 is $P_{sun}$ equals 750 W/m² for the optimized grating and QWL, but lower $P_{sun}$ less than 400 W/m² for FPR and RCS. Since the absorptivity is statically high and VO₂ does not transition phases in visible to NIR wavelengths, the coating's outgoing emissive power at any temperature, $P_{coat}$ cannot overcome sunlight absorption power, $P_{sun}$. These effects become more evident below on analysis of coating temperature under sunlight for 24 hours.

Figure 15A:
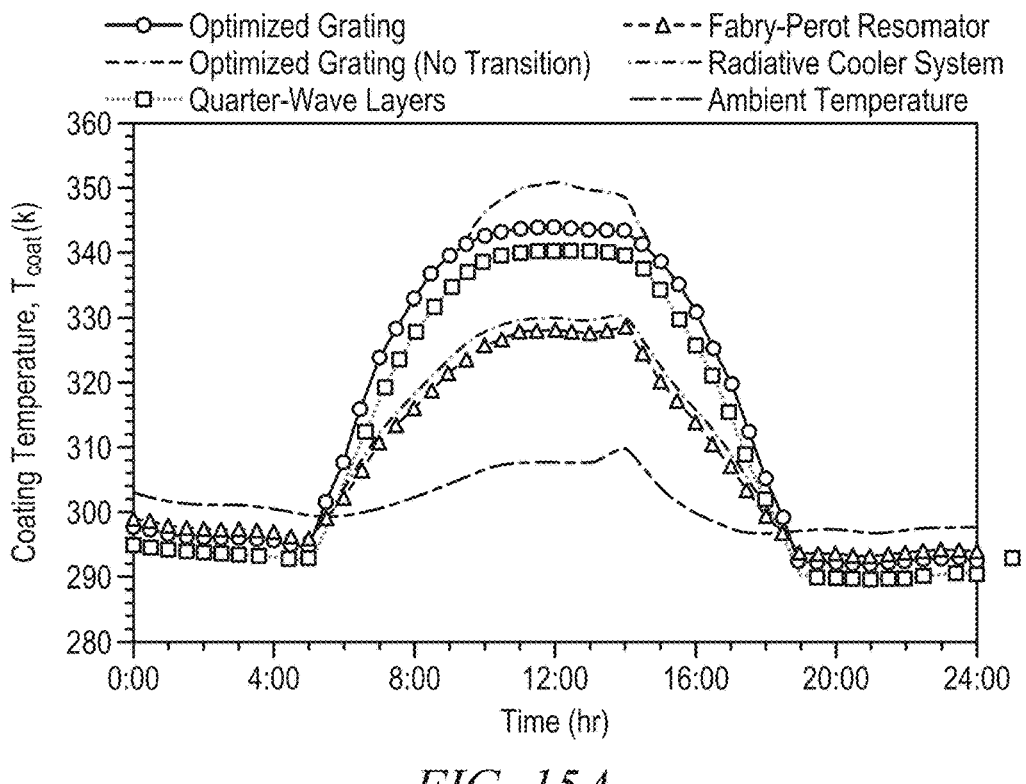
FIG. 15A is a graphical depiction of a twenty-four hour coating temperature ($T_{coat}$) analysis evaluated at the ambient temperature using Equation (Eq.) (10).

Referring to FIG. 15, the coating temperature and coating radiative cooling power demonstrates over 24 hours. Referring to FIG. 15A, the coatings' temperature change is depicted with respect to ambient temperature from local meteorological data (wunderground.com: 32.90° N, 97.04° W) and solar irradiation from measured direct normal irradiation (DNI) data (glob-alsolaratlas.com: 33.20° N, 97.12° W) from Aug. 1, 2021, in Denton, TX USA. The time-dependent coating temperature, $T_{coat}$ is calculated by, $$P_{coat}(T_{coat})-P_{atm}(T_{coat},T_{amb})-\alpha G_{sun}+h_c(T_{coat}-T_{amb})=0 \quad (10)$$

where α is the total normal absorptivity, and $G_{sun}$ is the DNI, which includes atmospheric transparency.

The Eq. (10) provides an implicit solution for $T_{coat}$, where iteration is simultaneous with the coating emissivity as VO₂ components go through transition, assuming no hysteretic relaxation. The fast temperature increases of the optimized grating and QWL are due to the high α. The QWL produces slightly lower temperature rise due to the low metallic concentration ratio f greater than 50% ($T_{coat}$ less than 351.5 K), where full range of phase transition is observed between 340 K and 360 K. The comparative cases of FPR and RCS maintain low temperature throughout the day and does not transition because of their lower α in the visible to NIR, $\alpha_{FPR}$ equals 0.40 and arcs equals 0.43. The optimized grating and QWL have $\alpha$ equals 0.84 and 0.85, respectively. Therefore, it warrants future techniques to minimize solar absorptivity of the optimized grating without affecting the turn-down in the mid- to far-IR. Lastly, if the optimized grating does not phase transition to metallic, the temperature can reach 351 K.

Figure 15B:
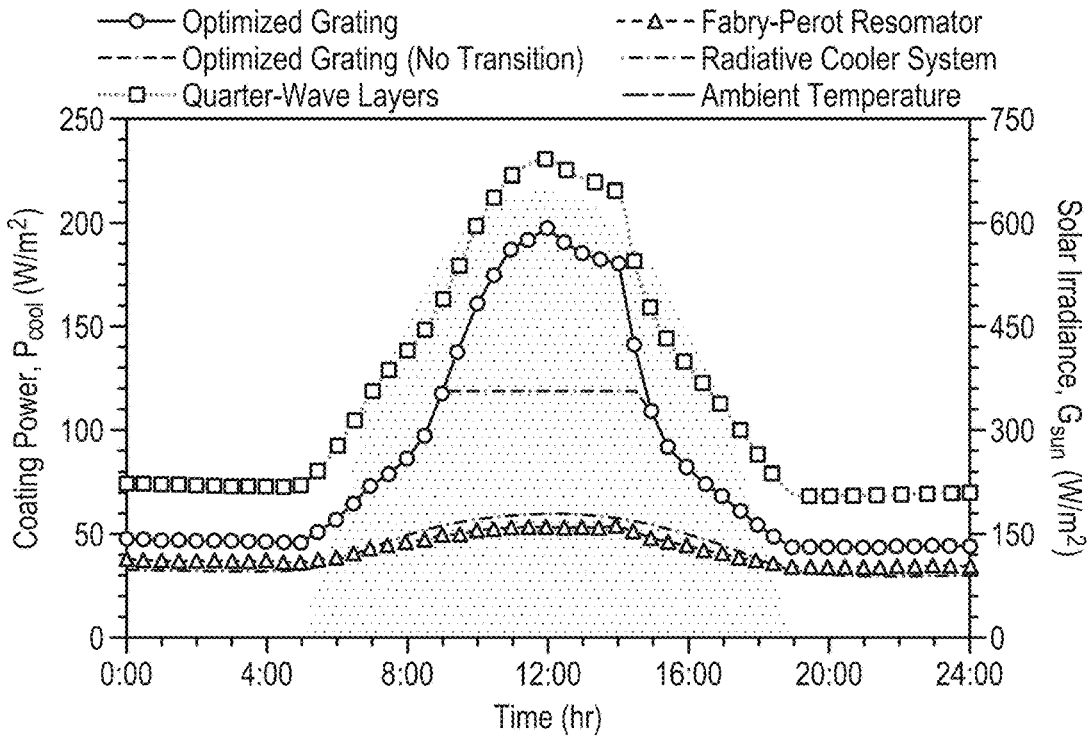
FIG. 15B is a graphical depiction of a coating's radiative cooling power ($P_{cool}$) capability evaluated during the day and night. Ambient temperature ($T_{amb}$, black dash-dotted line) and direct normal irradiation ($G_{sun}$, grey background) are obtained from Denton, TX USA meteorological measurement and simulated solar data for Aug. 1, 2021.

Referring to FIG. 15B, the radiative cooling power, and the DNI data are shown. The trends are similar to the coating temperature distribution for each case. Passive radiative cooling power, $P_{cool}$, is defined as, $$P_{cool} = P_{coat}(T_{coat}) - P_{atm}(T_{coat}, T_{amb}) \qquad (11)$$

The FPR and RCS have lower passive cooling simply because of lower absorption of sunlight ($P_{sun}$). This leads to the suppression of coating temperature rise and leads to low radiative cooling of $P_{cool}$ equals 54 and 59 W/m² for the FPR and RCS, respectively. The QWL achieves $P_{cool}$ equals 233 W/m² only because it does not become fully metallic, and onsets to a higher coating radiative power as shown in FIG. 14B. While this is greater than the optimized grating radiative power ($P_{cool}$ equals 198 W/m²), the optimized grating adds radiative power of 77.8 W/m² because of partial VO₂ phase transition. Therefore, the insulator-to-metal transition has a gradual and partial effect on cooling, but coatings should have maximal insolation such as in desert or space environments to best achieve their full temperature transition.

The on-state cooling capability of the optimized VO₂ coating can also be roughly compared to coatings strictly designed for daytime radiative cooling, such as SiO₂ and HfO₂ multilayer, SiO₂-polymer hybrid metamaterial, and plain PDMS coatings. These coating cooling powers are 82 W/m² of the SiO₂ and HfO₂ multilayer, 110 W/m² of the SiO₂-polymer hybrid metamaterial, and 188 W/m² from a 300 μm thick PDMS coating. These comparisons are not necessarily under the same conditions, but rather provide an estimate of overall radiative cooling power capabilities. While this new VO₂ design may not be an effective radiative cooler under the sun, it is rather more effective in responsive thermal regulation of hot bodies exceeding 70° C. in the shade. It is commendable for this 2 μm-thin coating to ensure that an equilibrium temperature can be obtained close to 345 K. This optimized coating can not only be helpful in maintaining efficiency in photovoltaic devices, but it also can be used for thermal management of components, such as rechargeable batteries, fuel tanks, and engines on both terrestrial and space vehicles.

A high turn-down VO₂ nanowire/dielectric cavity/VO₂ sub-layer/silver thin film of no more than 2 μm thickness for passive thermal management applications can be developed via computational optimization and the working mechanisms as described herein. The Monte-Carlo method obtained the optimal structure parameters for VO₂ components based on optical anti-reflection mechanism in the cold state and switching to resonance cavity absorption in the hot state. By analyzing the electric field densities, infrared waves are transmitted through the coating with little attenuation through the VO₂ sub-monolayer in the cold state, resulting in high reflectance from the silver substrate. High power dissipation density (PDD) can be observed within the VO₂ components in the high temperature metallic state, indicating both increased attenuation and strong resonant coupling between the complex structured VO₂ semi-metal and metal boundaries. Further analysis found an even higher FOM from an ideal dielectric spacer of n equals 2.2, close to that of ZnSe or ZnS. This optimized structure was compared with other Fabry-Perot based multilayer VO₂ turn-down structures, and a superior figure of merit (FOM) can be obtained compared to these other structures due to the key sub-monolayer VO₂. This structure can provide total cooling power of 271 W/m² in its hot state, higher than previously proposed VO₂ structures. However, the total cooling power is reduced under the sun and environment with iterative energy balances because of its high solar absorptivity for the presence of the sub-monolayer VO₂. With a 24-hour analysis of the coating, it can quickly switch between its insulating and full metallic states.

A simple FOM-weighted computational parameter finding method to help identify an optimal grating structure guided by optical physics and electromagnetic dissipation is disclosed. This uniaxial horizontal nanowire grating can allow a degree of high performance FOM due to the averaging of contrasting polarizations. This FOM maxima search is only assistive, as designs can be improved with additional parameter variation and intuitive iteration. More complex 2D and shaped grating arrays are unlikely to offer higher turn-down performance, compared to nanowires that can be chemically grown and roll-deposited onto a surface. These nanowires also offer a potentially easier large-area drop-deposition technique compared to solid VO₂ that may be grown thinner. The theoretical backing of a semi-metal-insulator-metal coupling dispersion, and realization of a horizontally spaced NW coating via large-area micromanufacturing techniques is provoked. Despite some performance tradeoffs between the VO₂ NW array and cavity material configurations, the optimally thick dissipative VO₂ sub-monolayer can become significant in emission turn-down. Globally, the found attributes of this proposed nanostructure can assist in self-regulation of heat from high thermal power density devices such as solar cells, computer hardware, compact electric motors, energy storage cells, and environmental radiative cooling surfaces.

In some embodiments, the periodic high-index dielectric grating, known as High Contrast Grating (HCG) is an alternative to Distributed Bragg Reflector (DBR) to achieve broad near-perfect reflectance. The HCG can produce Fabry-Perot Round Trip (FP-RT) resonances which may be observed for both one- and two-dimensional gratings. Typically, HCG is used in surface emitting lasers and waveguides to achieve reflectance over 99%. On the other hand, at-wavelength prism utilizes total internal reflection (TIR) for high reflectance. A similar approach can be taken for thermochromic and thermo-radiative cooling metasurface.

Referring to FIGS. 1E and 1F, 1D and 2D RCWA can be utilized to calculate the optical properties of the designed 1D and 2D HCG and prism array constructed on MIR coatings with low-index spacer. Low-index spacer may be introduced to confirm that HCG and Prism array is fully surrounded by low-index material in all interfaces. The period of the HCG and prism array is chosen to be near wavelength, $\Lambda$ about $\lambda$.

Figures 16A, 16B, 16C:
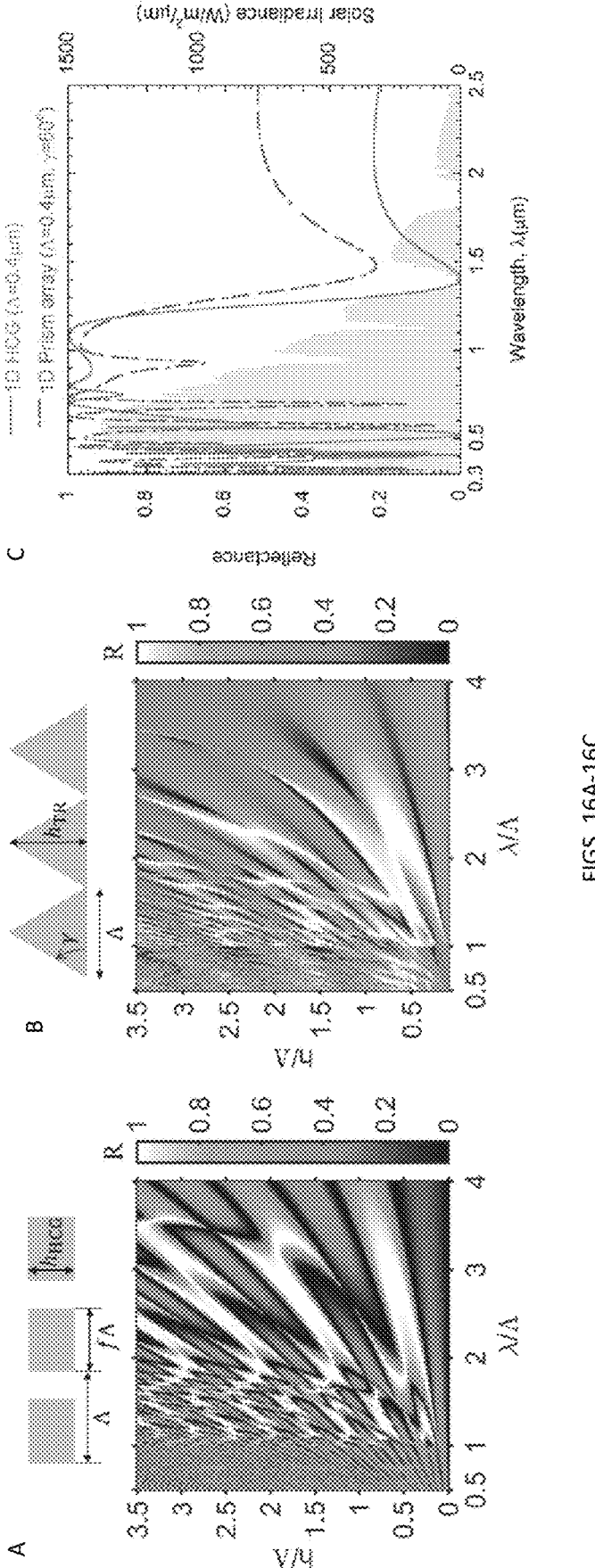
FIGS. 16A-C are graphical depictions of reflectance contour of (A) 1D HCG, (B) 1D prism array utilizing lossless Ge (n=4.0), and (C) reflectance spectrum of lossless Ge (n=4.0) 1D HCG and 1D prism array when A equals 0.4 μm, $h_{HCG}$ equals 0.5 Λ, γ equals 60 degrees, and $h_{TR}$ equals Λ sin(γ)/2 cos(γ). Background is the solar irradiance spectrum.

The two modes can be described with FP-RT equations, and $H_{y0}$ and $H_{y2}$ can be obtained by solving the eigenvalues (1D HCG). The FP-RT eigenequation is given by, $$M(\lambda, h)\begin{bmatrix} A_0 \\ A_2 \end{bmatrix} = |Q|e^{i\phi}\begin{bmatrix} A_0 \\ A_2 \end{bmatrix} \qquad (11)$$

where M is the RT propagation matrix, $A_j$ is the eigenmode coefficients, and $|G|e^{i\phi}$ is the eigenvalues. The phase condition $\phi$ requires to be multiples of pi so that $\phi$ equals 2 m$\pi$ (m equals 0, 1, 2, 3, . . . ). These two RT modes can lead to broad reflectance in VIS-NIR region as shown in FIG. 16C (solid line). The dual-mode region is provided by solving for longitudinal propagation constant equals to zero, and its cut-off wavelength for lossless Ge (n equals 4.0) is $\lambda/\Lambda$ equals 3.75 ($H_{y0}$) and $\lambda/\Lambda$ equals 1.72 ($H_{y2}$) which corresponds to 1.5 µm and 0.688 µm for $\Lambda$ equals 0.4 µm.

In contrast, Prism array creates an absorptance drop at certain wavelength due to TIR. The corner angle, $\gamma$ must meet the TIR equation given by, $$\theta_c = \sin^{-1}\left(\frac{n_L}{n_{TE}}\right) \tag{12}$$

where $n_L$ and $n_{TR}$ is the refractive index of low-index spacer and the prism array. Multiple $(m+1)\lambda/2n_{TR}$ modes appear for prism array at different wavelengths which also results in broad reflectance similar to HCG (as depicted in FIG. 16C, dash-dotted line). Hence, it produces similar reflectance contour patterns as shown in FIG. 16B. Due to multi-modes in Prism array, slight narrower reflectance is observed compared to HCG.

In consequence, both HCG and Prism array can show similar electromagnetic field behavior inside the high-index material to produce broad reflectance in VIS-NIR region. The MIR transparency is met with using Si and Ge due to its low extinction coefficient in IR region. Therefore, high-index HCG and Prism array can be integrated on thermochromic and thermoradiative metasurface so that it rejects sunlight and maintains high transmittance in MIR to enable desired thermal radiative properties in MIR.

Additional advantages may be apparent to one of skill in the art viewing this disclosure.

Having described various systems and methods herein, certain embodiments can include, but are not limited to:

In a first aspect, a passive thermal switch coating comprises: a first thermochromic oxide layer; a layer of an infrared-transparent dielectric material; and a second thermochromic oxide layer, wherein the infrared-transparent dielectric material is disposed between the first thermochromic oxide layer and the second thermochromic oxide layer.

A second aspect that can include the passive thermal switch coating of the first aspect, further comprises: a substrate, wherein the second thermochromic oxide layer is disposed on the substrate.

A third aspect that can include the passive thermal switch coating of the first aspect or the second aspect, further comprises: a second layer of an infrared-transparent dielectric material disposed on the first thermochromic oxide layer, wherein the first thermochromic oxide layer is disposed between the layer of the infrared-transparent dielectric material and the second layer of the infrared-transparent dielectric material.

A fourth aspect can include the passive thermal switch coating of any of the preceding aspects, wherein the layer of the infrared-transparent dielectric material and the second layer of the infrared-transparent dielectric material are formed from a same infrared-transparent dielectric material.

A fifth aspect can include the passive thermal switch coating of any of the preceding aspects, wherein the layer of the infrared-transparent dielectric material and the second layer of the infrared-transparent dielectric material are formed from different infrared-transparent dielectric materials.

A sixth aspect can include the passive thermal switch coating of any of the preceding aspects, further comprises: a high contrast grating formed on the second layer of the infrared-transparent dielectric material on a side of the second layer of the infrared-transparent dielectric material opposite the first thermochromic oxide layer.

A seventh aspect can include the passive thermal switch coating of any of the preceding aspects, wherein the first thermochromic oxide layer or the second thermochromic oxide layer is formed from $VO_2$.

An eighth aspect can include the passive thermal switch coating of any of the preceding aspects, wherein the infrared-transparent dielectric material comprises $BaF_2$, $MgF_2$, KBr, or any combination thereof.

A ninth aspect can include the passive thermal switch coating of any of the preceding aspects, wherein the passive thermal switch coating is configured to have $\alpha$ variable thermal emissivity between about 0.8 and about 0.2 based on a change in temperature of the passive thermal switch coating.

A tenth aspect can include the passive thermal switch coating of any of the preceding aspects, wherein the passive thermal switch coating is configured to have $\alpha$ change in a thermal emissivity of at least 0.5 based on a change in temperature.

In an eleventh aspect, a method of providing a passive thermal switch coating comprises: disposing a first thermochromic oxide layer; disposing a layer of an infrared-transparent dielectric material; and disposing a second thermochromic oxide layer, wherein the infrared-transparent dielectric material is disposed between the first thermochromic oxide layer and the second thermochromic oxide layer.

A twelfth aspect can include the method of the eleventh aspect, further comprises: disposing a substrate, wherein the second thermochromic oxide layer is disposed on the substrate.

A thirteenth aspect can include the method of the eleventh aspect or twelfth aspect, further comprises: disposing a second layer of an infrared-transparent dielectric material disposed on the first thermochromic oxide layer, wherein the first thermochromic oxide layer is disposed between the layer of the infrared-transparent dielectric material and the second layer of the infrared-transparent dielectric material.

A fourteenth aspect can include the method of any the eleventh aspect to the thirteenth aspect, wherein the layer of the infrared-transparent dielectric material and the second layer of the infrared-transparent dielectric material are formed from a same infrared-transparent dielectric material.

A fifteenth aspect can include the method of any the eleventh aspect to the fourteenth aspect, wherein the layer of the infrared-transparent dielectric material and the second layer of the infrared-transparent dielectric material are formed from different infrared-transparent dielectric materials.

A sixteenth aspect can include the method of any the eleventh aspect to the fifteenth aspect, further comprises: disposing a high contrast grating formed on the second layer of the infrared-transparent dielectric material on a side of the second layer of the infrared-transparent dielectric material opposite the first thermochromic oxide layer.

A seventeenth aspect can include the method of any the eleventh aspect to the sixteenth aspect, wherein the first thermochromic oxide layer or the second thermochromic oxide layer is formed from $VO_2$.

An eighteenth aspect can include the method of any the eleventh aspect to the seventeenth aspect, wherein the infrared-transparent dielectric material comprises $BaF_2$, $MgF_2$, KBr, or any combination thereof.

A nineteenth aspect can include the method of any the eleventh aspect to the eighteenth aspect, wherein the coating varies a thermal emissivity between about 0.8 and about 0.2 based on a change in temperature of the passive thermal switch coating.

A twentieth aspect can include the method of any the eleventh aspect to the nineteenth aspect, wherein the passive thermal switch coating changes a thermal emissivity of at least 0.5 based on a change in temperature.

For purposes of the disclosure herein, the term "comprising" includes "consisting" or "consisting essentially of" Further, for purposes of the disclosure herein, the term "including" includes "comprising," "consisting," or "consisting essentially of".

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the embodiments of the present invention. The discussion of a reference in the Description of Related Art is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

While embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$, and an upper limit, $R_U$, is disclosed, any number falling within the range is specifically disclosed. In particular, the following numbers within the range are specifically disclosed: $R=R_L+k*(R_U-R_L)$, wherein k is a variable ranging from 1 percent to 100 percent with a 1 percent increment, i.e., k is 1 percent, 2 percent, 3 percent, 4 percent, 5 percent, 50 percent, 51 percent, 52 percent, 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. As used herein, the term "and/or" can mean one, some, or all elements depicted in a list. As an example, "A and/or B" can mean A, B, or a combination of A and B. As used herein, the symbol "1" means "and". Use of broader terms such as comprises, includes, having, etc. should be understood to provide support for narrower terms such as consisting of, consisting essentially of, comprised substantially of, etc.

From reading the present disclosure, other variations and modifications will be apparent to persons skilled in the art. Such variations and modifications may involve equivalent and other features which are already known in the art, and which may be used instead of or in addition to features already described herein.

The invention claimed is:

1. A passive thermal switch coating comprising:
   a first thermochromic oxide layer formed as a periodic nanowire array from $VO_2$;
   a layer of an infrared-transparent dielectric material; and
   a second thermochromic oxide layer, wherein the infrared-transparent dielectric material is disposed between the first thermochromic oxide layer and the second thermochromic oxide layer.

2. The passive thermal switch coating of claim 1, further comprising:
   a substrate, wherein the second thermochromic oxide layer is disposed on the substrate.

3. The passive thermal switch coating of claim 1, further comprising:
   a second layer of an infrared-transparent dielectric material disposed on the first thermochromic oxide layer, wherein the first thermochromic oxide layer is disposed between the layer of the infrared-transparent dielectric material and the second layer of the infrared-transparent dielectric material.

4. The passive thermal switch coating of claim 3, wherein the layer of the infrared-transparent dielectric material and the second layer of the infrared-transparent dielectric material are formed from a same infrared-transparent dielectric material.

5. The passive thermal switch coating of claim 3, wherein the layer of the infrared-transparent dielectric material and the second layer of the infrared-transparent dielectric material are formed from different infrared-transparent dielectric materials.

6. The passive thermal switch coating of claim 1, wherein the nanowire array forms a grating.

7. The passive thermal switch coating of claim 1, wherein the second thermochromic oxide layer is formed from $VO_2$.

8. The passive thermal switch coating of claim 1, wherein the infrared-transparent dielectric material comprises $BaF_2$, $MgF_2$, KBr, or any combination thereof.

9. The passive thermal switch coating of claim 1, wherein the passive thermal switch coating is configured to have a variable thermal emissivity between about 0.8 and about 0.2 based on a change in temperature of the passive thermal switch coating.

10. The passive thermal switch coating of claim 1, wherein the passive thermal switch coating is configured to have a change in a thermal emissivity of at least 0.5 based on a change in temperature.

11. A method of providing the passive thermal switch coating of claim 1, the method comprising:
   disposing the first thermochromic oxide layer;
   disposing the layer of the infrared-transparent dielectric material; and
   disposing the second thermochromic oxide layer to form the passive thermal switch coating, wherein the infrared-transparent dielectric material is disposed between the first thermochromic oxide layer and the second thermochromic oxide layer.

12. The method of claim 11, further comprising:
   disposing a substrate, wherein the second thermochromic oxide layer is disposed on the substrate.

13. The method of claim 11, further comprising:

disposing a second layer of an infrared-transparent dielectric material disposed on the first thermochromic oxide layer, wherein the first thermochromic oxide layer is disposed between the layer of the infrared-transparent dielectric material and the second layer of the infrared-transparent dielectric material.

14. The method of claim 13, wherein the layer of the infrared-transparent dielectric material and the second layer of the infrared-transparent dielectric material are formed from a same infrared-transparent dielectric material.

15. The method of claim 13, wherein the layer of the infrared-transparent dielectric material and the second layer of the infrared-transparent dielectric material are formed from different infrared-transparent dielectric materials.

16. The method of claim 13, further comprising:

disposing a high contrast grating formed on the second layer of the infrared-transparent dielectric material on a side of the second layer of the infrared-transparent dielectric material opposite the first thermochromic oxide layer.

17. The method of claim 11, wherein the first thermochromic oxide layer or the second thermochromic oxide layer is formed from $VO_2$.

18. The method of claim 11, wherein the infrared-transparent dielectric material comprises $BaF_2$, $MgF_2$, KBr, or any combination thereof.

19. The method of claim 11, wherein the coating varies a thermal emissivity between about 0.8 and about 0.2 based on a change in temperature of the passive thermal switch coating.

20. The passive thermal switch coating of claim 1, wherein the nanowire array comprises nanowires having a thickness between 50 nanometers (nm) and 150 nm.

* * * * *